US008499025B2

(12) United States Patent
Howard

(10) Patent No.: US 8,499,025 B2
(45) Date of Patent: Jul. 30, 2013

(54) APPARATUS FOR ENHANCING PERFORMANCE OF A PARALLEL PROCESSING ENVIRONMENT, AND ASSOCIATED METHODS

(75) Inventor: Kevin D. Howard, Tempe, AZ (US)

(73) Assignee: Massively Parallel Technologies, Inc., Boulder, CO (US)

(*) Notice: Subject to any disclaimer, the term of this patent is extended or adjusted under 35 U.S.C. 154(b) by 792 days.

(21) Appl. No.: 12/750,338

(22) Filed: Mar. 30, 2010

(65) Prior Publication Data
US 2010/0185719 A1 Jul. 22, 2010

Related U.S. Application Data

(60) Continuation-in-part of application No. 12/197,881, filed on Aug. 25, 2008, now Pat. No. 7,730,121, which is a division of application No. 10/340,524, filed on Jan. 10, 2003, now Pat. No. 7,418,470, and a continuation-in-part of application No. 09/603,020, filed on Jun. 26, 2000, now Pat. No. 6,857,004.

(60) Provisional application No. 61/165,301, filed on Mar. 31, 2009, provisional application No. 60/347,325, filed on Jan. 10, 2002.

(51) Int. Cl.
*G06F 15/16* (2006.01)
*G06F 15/173* (2006.01)
*G06F 11/16* (2006.01)
*G06F 13/00* (2006.01)
*G06F 12/00* (2006.01)

(52) U.S. Cl.
USPC ........... 709/201; 709/230; 709/250; 709/240; 714/6.12; 710/68; 711/114

(58) Field of Classification Search
USPC .... 709/201, 230, 250, 240; 714/6.12; 710/68; 711/114
See application file for complete search history.

(56) References Cited

U.S. PATENT DOCUMENTS 5,166,674 A 11/1992 Baum et al.
5,210,866 A * 5/1993 Milligan et al. ............. 714/6.12

(Continued)

FOREIGN PATENT DOCUMENTS

EP 0107453 5/1984
EP 0640930 5/1995

(Continued)

OTHER PUBLICATIONS

Thibodeaux, "Organizers Hope to Give Lafayatte Superstart in High-Tech Direction", Oct. 1927, Supercomputeronline.com, 2 pages.

(Continued)

*Primary Examiner* — David Lazaro
*Assistant Examiner* — Vitali Korobov
(74) *Attorney, Agent, or Firm* — Lathrop & Gage LLP

(57) ABSTRACT

Parallel Processing Communication Accelerator (PPCA) systems and methods for enhancing performance of a Parallel Processing Environment (PPE). In an embodiment, a Message Passing Interface (MPI) devolver enabled PPCA is in communication with the PPE and a host node. The host node executes at least a parallel processing application and an MPI process. The MPI devolver communicates with the MPI process and the PPE to improve the performance of the PPE by offloading MPI process functionality to the PPCA. Offloading MPI processing to the PPCA frees the host node for other processing tasks, for example, executing the parallel processing application, thereby improving the performance of the PPE.

35 Claims, 24 Drawing Sheets

U.S. PATENT DOCUMENTS

| | | | |
|---|---|---|---|
| 5,224,100 A | 6/1993 | Lee et al. | |
| 5,247,638 A * | 9/1993 | O'Brien et al. | 710/68 |
| 5,276,899 A * | 1/1994 | Neches | 709/240 |
| 5,325,526 A | 6/1994 | Cameron et al. | |
| 5,349,682 A | 9/1994 | Rosenberry | |
| 5,371,852 A | 12/1994 | Attanasio et al. | |
| 5,403,639 A * | 4/1995 | Belsan et al. | 1/1 |
| 5,488,609 A | 1/1996 | Hluchyj et al. | |
| 5,689,722 A | 11/1997 | Swarztrauber | |
| 5,699,500 A | 12/1997 | Dasgupta | |
| 5,758,144 A | 5/1998 | Eberhard et al. | |
| 5,838,906 A | 11/1998 | Doyle et al. | |
| 5,857,076 A | 1/1999 | Schmidt | |
| 5,860,010 A | 1/1999 | Attal | |
| 5,905,736 A | 5/1999 | Ronen et al. | |
| 6,014,669 A | 1/2000 | Slaughter et al. | |
| 6,076,115 A * | 6/2000 | Sambamurthy et al. | 709/250 |
| 6,085,248 A * | 7/2000 | Sambamurthy et al. | 709/229 |
| 6,108,713 A * | 8/2000 | Sambamurthy et al. | 709/250 |
| 6,117,180 A | 9/2000 | Dave et al. | |
| 6,154,765 A | 11/2000 | Hart | |
| 6,163,855 A | 12/2000 | Shrivastava et al. | |
| 6,167,428 A | 12/2000 | Ellis | |
| 6,295,573 B1 | 9/2001 | Bailey et al. | |
| 6,393,489 B1 * | 5/2002 | Sambamurthy et al. | 709/250 |
| 6,434,620 B1 * | 8/2002 | Boucher et al. | 709/230 |
| 7,076,568 B2 * | 7/2006 | Philbrick et al. | 709/250 |
| 7,284,070 B2 * | 10/2007 | Boucher et al. | 709/250 |
| 7,664,883 B2 * | 2/2010 | Craft et al. | 709/250 |
| 2001/0011294 A1 | 8/2001 | Ellis | |
| 2001/0037406 A1 * | 11/2001 | Philbrick et al. | 709/250 |
| 2002/0026558 A1 * | 2/2002 | Reuter et al. | 711/114 |
| 2002/0091844 A1 * | 7/2002 | Craft et al. | 709/230 |
| 2003/0135614 A1 | 7/2003 | Hattori et al. | |
| 2005/0195168 A1 * | 9/2005 | Rosenberg et al. | 345/161 |
| 2008/0126553 A1 * | 5/2008 | Boucher et al. | 709/230 |

FOREIGN PATENT DOCUMENTS

| | | |
|---|---|---|
| EP | 0921485 | 6/1999 |
| EP | 1031923 | 8/2000 |
| EP | 1096378 | 5/2001 |
| WO | 9427216 | 11/1994 |
| WO | 9919807 | 4/1999 |
| WO | 0101219 | 1/2001 |

OTHER PUBLICATIONS

IBM, "Cluster-Based Stack Optimization Algorithm for Very Large-scale Integration", Sep. 1987, IBM Technical disclosure Bulletin, vol. 30, Issue 4, p. No. 1445-1447 (4).

Chong et al, "Concurrent Processing for Picture Archiving and Comunication system (PACS)", Jun. 1995, IEEE, p. No. 468-472.

Antaki et al, "The soft side of New Enterprise", May 1999, MIT enterprise Forum of Dallus Network Inc., 2 pages.

Hitachi, "The Next Generation of Information Technology", spring 97, Hitachi today No. 39, p. No. 1-6 and cover page.

Kahaner, "Fujitsu's 2.sup.nd Parallel computing WS (PCW'93) Nov. 1993 Kawasaki Japan" Dec. 1993, 15 pages.

Ryan et al, "A Scalable Distributed Multimedia Knowledge Retrieval System on a cluster of Heterogeneous High Performance Architectures", International Journal on artificial intelligence tools, vol. 9, No. 3 (2000) p. No. 343-367.

(Author unknown), "CAD comes on line", Feb. 21, 2000, p. s-28, Design News—Automotive.

Danny Hillis, "Massive, Parallel Supercomputers—Where they're Going—How They'll Work", Forbes ASAP, Feb. 22, 1999, pp. 60-62 and 64.

Internet Information article: "MSC.SOFTWARE Announces visualNastran 4d2Go; A total Engineering Solution to be Bundled with CAD Products", Mar. 6, 2000.

Cohen, ED et al. Efficient Covexity and Domination Algorithms for Fine-and Medium-Grain Hybercube Computers, Algoithmica, vol. 7, pp. 51-75, Springer Verlag New York, Inc., 1992.

Benedicts, E.P., "Multiprocessor architectures are converging", Hypercube Concurrent Computers and Applications: Proceedings of the third conference on Hypercube concurrent computers and applications: Architecture, software, computer systems, and general issues, vol. 1, pp. 12-20, Pasadena, California, Jan. 19-20, 1988.

Livingston, Marilyn L. and Stout, Quentin F., "Fault Tolerance of the Cyclic Buddy Subcube Location Sceme in Hypercubes", Proceedings of the 6th Distributed Memory Computing Conference (1991), IEEE, pp. 34-41, 1991.

Fox, G.C., "What have we learnt from using real parallel machines on real problems?", Hypercube Concurrent Computers and Applications: Proceedings of the third conference on Hypercube concurrent computers and applications: Architecture, software, computer systems, and general issues, vol. 2, pp. 897-955, Pasadena, California, Jan. 19-20, 1988.

"Topologies—computational messaging for multicomputers", Hypercube Concurrent Computers and Applications: Proceedings of the third conference on Hypercube concurrent computers and applications: Architecture, software, computer systems, and general issues, vol. 1, pp. 580-593, Pasadena, California, Jan. 19-20, 1988.

Keagle, C., et al.: "Categorization and performance analysis of advanced avionics algorithms on parallel processing architectures" IEE, May 22, 1989, pp. 1722-1724.

Trystram D: "Scheduling parallel applications using malleable tasks on clusters" Parallel and Distributed Processing Syposium., Proceedings 15th International San Francisco, CA, USA Apr. 23-27, 2001, Los Alamitos, CA USA, IEE Comput. Soc, 2128-2135.

Min-Bin Chen, et al.: "Parallel 2d delaunay triangulations in hpf and mpi" Parallel and Distributed Processing Symposium, Proceeding 15th International San Francisco, CA, USA Apr. 23-27, 2001, Los Alamitos, CA, USA, IEEE Comput. Soc, 301-308.

Fernandez, E.B., et al: "Fault-tolerant parallel algorithms" Proceedings of Southeaston. Williamsburg, Spril 7-10 1991, Proceedings of the Southeast Conference, New York, IEEE, US vol. 1, Apr. 7, 1991, pp. 466-469.

Xiaoxiong, Zhong, et al.: "Optimal implantation of parallel divide-and-conquer algooriths on de Bruijn networks" Frontiers of assively Parallel Computatioh, 1992., Fourth Symposium on the McLean, VA, USA Oct. 19-21, 1992, Los Alamitos, CA, USA, IEEE Comput. Soc, US Oct. 19, 1992, pp. 583-585.

Welch, L.R., et al.: "Metrics and techniques for automatic partitioning and assignment of object-based concurrent programs" Parallel and Distributed Processing, 1995. Proceedings. Seventh IEEE Symposium on San Antonio, TX, USA Oct. 25-28, 1995, Los Alamitos,CA, USA, IEEE Comput. Soc, US, Oct. 25, 1995, pp. 440-447.

Kwan, A.W., et al.: "Using parallel programming paradigms for structuing programs on distributed memory computers" IEE, Apr. 28, 1991, pp. 210-213.

Grundy, J: "Software architecture modelling, analysis an dimplementation with softarch" Proc 34th Hawaii International Conference on System Sciences, Jan. 3, 2001, pp. 3825-3834.

Pontelli, E., et al: "Automatic compile-time parallelization of prolog programs for dependent and-parallelism" Proc. of the Fourteenth International Conference on Logic Programming, [online] Jul. 1997, pp. 108-122, Retrieved From the Internet URL:http://citeseer.ist.psu.edu/cacxhe/papers/cs/16510/http:zSzzSzwww.cs.nmsu.eduzSzguptazSzacezSzstaticdap.pdf/pontelli97automatic.pdf> [retrieved Sep. 1, 2004].

Coddington, P.D., et al: "Web-based access to distributed high-performance geographic information systems for decision support" Proceedings of the Hawaii International Conference on System Sciences, XX, XX, Jan. 5, 1999, pp. 1-12.

"Method Sending Object Agent and Receiving Object Agent" IBM Technical Disclosure Bulletin, IBM Corp. New York, US, vol. 39, No. 12, Dec. 1, 2996, p. 43.

Cameron, I, et al.: "BT Webworld TM-WEB Hosting for Every business Need" British Telecommunications Engineering, British Telecommunications Engineering, London, GB, vol. 16, No. 4, 1998, pp. 273-278.

Saletore, V.A., et al.: "Parallel Computations on the CHARM Heterogeneous Workstation Cluster" High Performance Distributed Computing, 1994, Proceedings of the Third IEEE International symposium on San Francisco, CA, USA Aug. 2-5, 1994, Los Alamitos, CA, USA, IEEE Comput. Soc, Aug. 2, 1994, pp. 203-210.

Desouza-Batista, J.C., et al.: "A Sub-optimal 28 Assignment of Application Tasks Onto Heterogeneous Systems" Heterogenous Computing Workshop, 1994, Proceedings Cancun, Mexico Apr. 26, 1994, Los Alamitos, CA USA, IEEE Comput Soc., 1994, pp. 9-16.

Ross, G.B. et al.: "A Scalable Mutlicomputer" Circuits and Systems, 1993, Proceedings of the 36th Midwest Symposium on Detroit, MI, USA Aug. 16-18, 1993, New York, NY, USA, IEEE, Aug. 16, 1993, pp. 1117-1120.

Chowdhury, A., et al.: "Supporting Dynamic Space-Sharing on Clusters of Non-Dedicated Workstations" Distributed Computing Systems, 1997, Proceedings of the 17th International Conference in Baltimore, MD, USA May 27-30, 1997, Los Alamitos, CA, USA, IEEE Comput. Soc, US May 27, 1997, pp. 149-158.

Selected File History from related U.S. Appl. No. 09/603,020; 100 pages; dated Sep. 16, 2003 through Oct. 14, 2004.

Selected File History from related U.S. Appl. No. 10/340,524; 44 pages; dated Aug. 6, 2007 through Apr. 18, 2008.

Selected File History from related U.S. Appl. No. 12/197,881; 22 pages; dated Sep. 9, 2009 through Jan. 28, 2010.

Selected File History from related European Patent Application No. 00944888.7, 41 pages, dated Jul. 1, 2004 through Sep. 22, 2006.

Selected File History from related European Patent Application No. 03713226.3, 45 pages, dated Apr. 19, 2007 through Feb. 15, 2010.

International Search Report from related PCT Patent Application No. PCT/US00/17576, 6 pages, Nov. 14, 2000.

International Search Report from related PCT Patent Application No. PCT/US03/000787, 8 pages, Sep. 2, 2004.

* cited by examiner

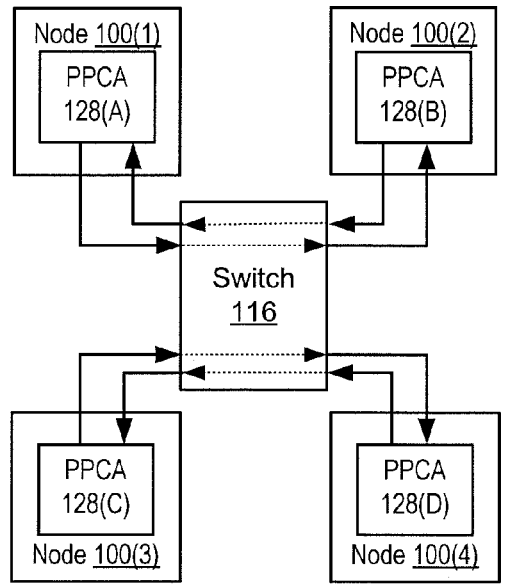
FIG. 9A
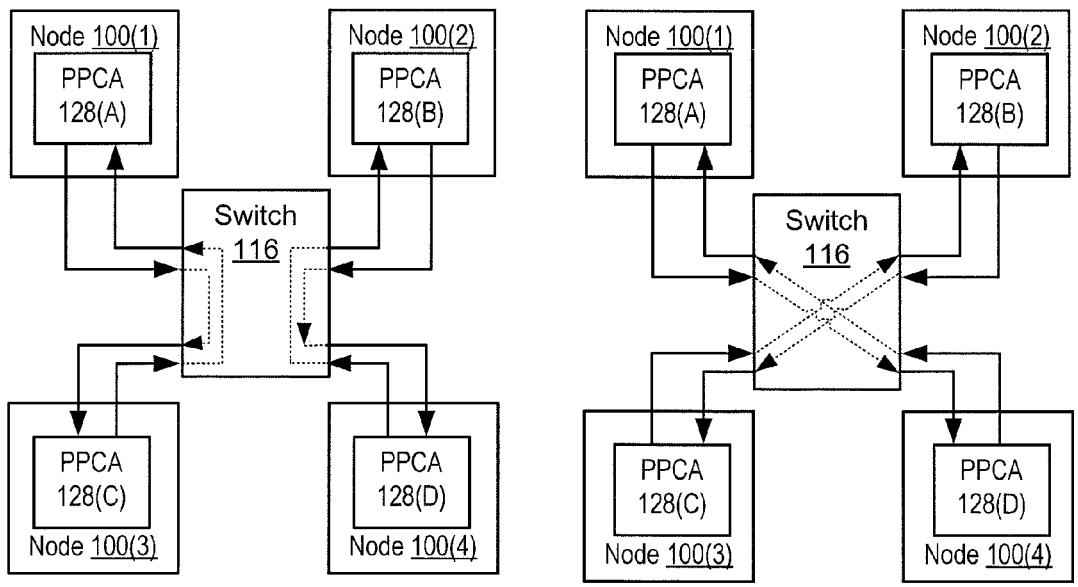
FIG. 9B
FIG. 9C

APPARATUS FOR ENHANCING PERFORMANCE OF A PARALLEL PROCESSING ENVIRONMENT, AND ASSOCIATED METHODS

RELATED APPLICATIONS

This application claims priority to U.S. Patent Application Ser. No. 61/165,301, filed Mar. 31, 2009, and U.S. Patent Application Ser. No. 61/166,630, filed Apr. 3, 2009, both of which are incorporated herein by reference. This application is also a continuation-in-part of U.S. patent application Ser. No. 12/197,881, filed Aug. 25, 2008, which is a divisional application of U.S. patent application Ser. No. 10/340,524, filed Jan. 10, 2003 (now U.S. Pat. No. 7,418,470), which claims priority to U.S. Patent Application Ser. No. 60/347,325, filed Jan. 10, 2002, and is a continuation-in-part of U.S. patent application Ser. No. 09/603,020 (now U.S. Pat. No. 6,857,004), filed on Jun. 26, 2000, all of which are incorporated herein by reference.

BACKGROUND

A parallel processing computer cluster is made up of networked computers that form nodes of the cluster. Each node of the cluster can contain one or more processors, each including one or more cores. A computational task, received from a requesting system, is broken down into sub-tasks that are distributed to one or more nodes for processing. If there are multiple processors and/or cores the computational task is further decomposed. Processing results from the cores are collected by the processors, and then collected by the node. From the node level, results are transmitted back to the requesting system. The methods of breaking down and distributing these sub-tasks, and then collecting results, vary based upon the type and configuration of the computer cluster as well as the algorithm being processed.

One constraint of current parallel processing computer clusters is presented by inter-node, inter-processor and inter-core communication. Particularly, within each computer node, a processor or core that is used to process a sub-task is also used to process low-level communication operations and make communication decisions. The time cost of these communication decisions directly impact the performance of the processing cores and processors, which directly impact the performance of the node.

Within a computer system, such as a personal computer or a server, a PCIe bus, known in the art, provides point-to-point multiple serial communication lanes with faster communication than a typical computer bus, such as the peripheral component interconnect standard bus. For example, the PCIe bus supports simultaneous send and receive communications, and may be configured to use an appropriate number of serial communication lanes to match the communication requirements of an installed PCIe-format computer card. A low speed peripheral may require one PCIe serial communication lane, while a graphics card may require sixteen PCIe serial communication lanes. The PCIe bus may include zero, one or more PCIe format card slots, and may provide one, two, four, eight, sixteen or thirty-two serial communication lanes. PCIe communication is typically designated by the number of serial communication lanes used for communication (e.g., "x1" designates a single serial communication lane PCIe channel and "x4" designates a four serial communication lane PCIe channel), and by the PCIe format, for example PCIe 1.1 of PCIe 2.0.

Regarding the PCIe formats, PCIe 1.1 format is the most commonly used PCIe format; PCIe version 2.0 was launched in 2007. PCIe version 2.0 is twice as fast as version 1.1. Compared to a PCI standard bus, PCIe 2.0 has nearly twice the bi-directional transfer rate of 250 MB/s (250 million bytes per second). A 32-bit PCI standard bus has a peak transfer rate of 133 MB/s (133 million bytes per second) and is half-duplex (i.e., it can only transmit or receive at any one time).

Within a parallel application, a message-passing interface (MPI) may include routines for implementing message passing. The MPI is typically called to execute the message passing routines of low-level protocols using hardware of the host computer to send and receive messages. Typically, MPI routines execute on the processor of the host computer.

In high performance computer clusters, cabling and switching between nodes or computers of a computer cluster may create significant issues. One approach to simplify cabling between nodes is blade technology, well known in the art, which uses a large backplane to provide connectivity between nodes. Blade technology has high cost and requires special techniques, such as grid technology, to interconnect large numbers of computer nodes. When connecting large numbers of nodes, however, grid technology introduces data transfer bottlenecks that reduce cluster performance. Furthermore, issues related to switching technology such as costs and interconnect limitations are not resolved by blade technology.

SUMMARY

Disclosed are Parallel Processing Communication Accelerator (PPCA) systems and methods for enhancing performance of a Parallel Processing Environment (PPE). The PPCA includes a micro-processing unit (MPU), a memory, a PPE connection for communicating with other nodes within the parallel processing environment, a host node connection for communicating with a host node and a Message Passing Interface (MPI) devolver. The MPI devolver communicates with a host node executed MPI process for optimizing communication between a host node executed parallel application and the parallel processing environment. In addition, the MPI devolver processes at least a portion of the MPI process including one or more of MPI collective-commands, MPI blocking commands, MPI group commands, and MPI topology.

BRIEF DESCRIPTION OF THE EMBODIMENTS

FIGS. 9A-C illustrates three steps of one exemplary all-to-all exchange in a holographic checkpoint enabled system.

Figure 10:
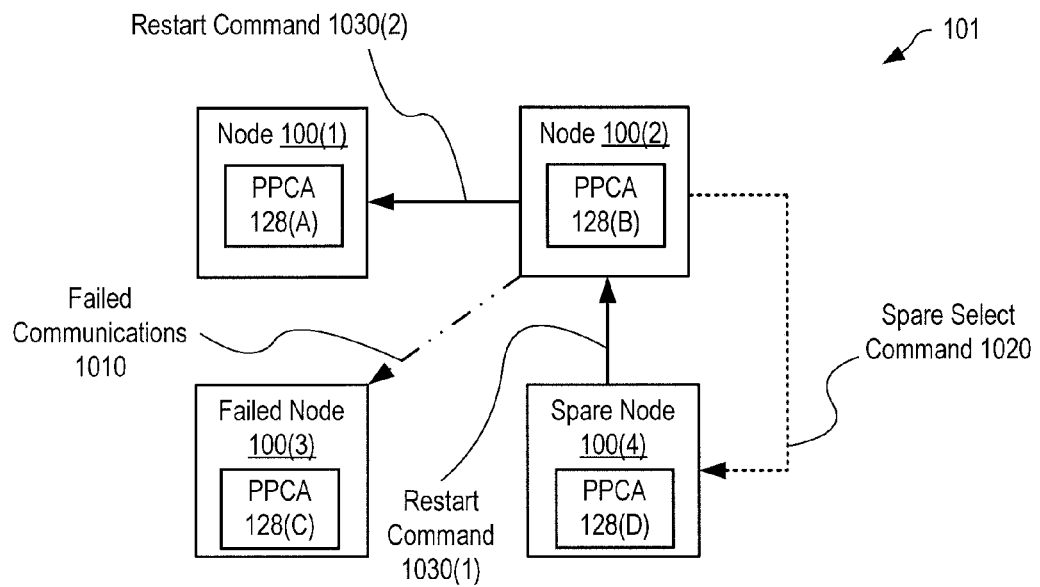

FIG. 10 shows one exemplary illustrative representation of one exemplary holographic checkpoint restart operation enabled system.

Figure 11:
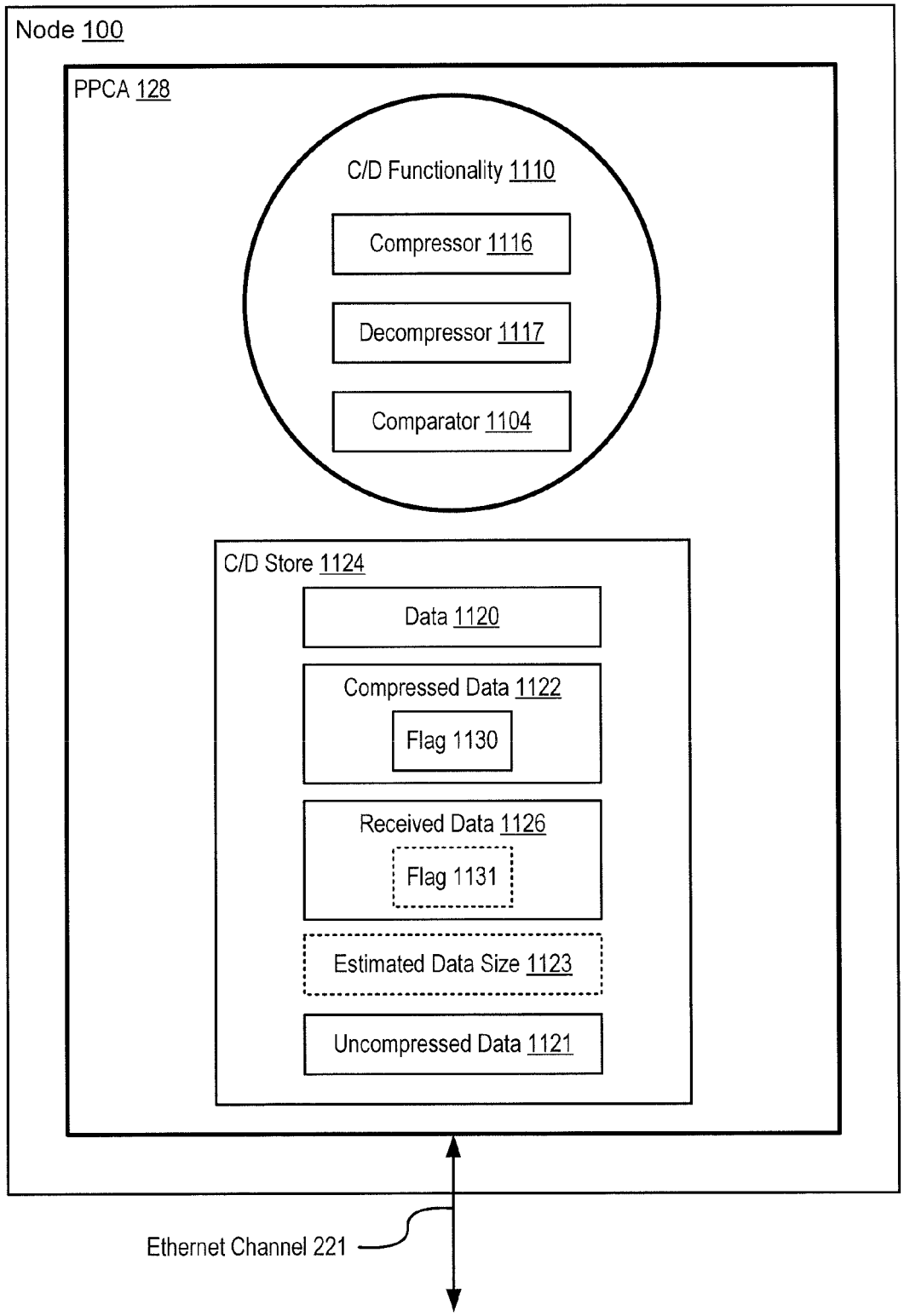

FIG. 11 shows one exemplary compression enabled system.

Figure 12A:
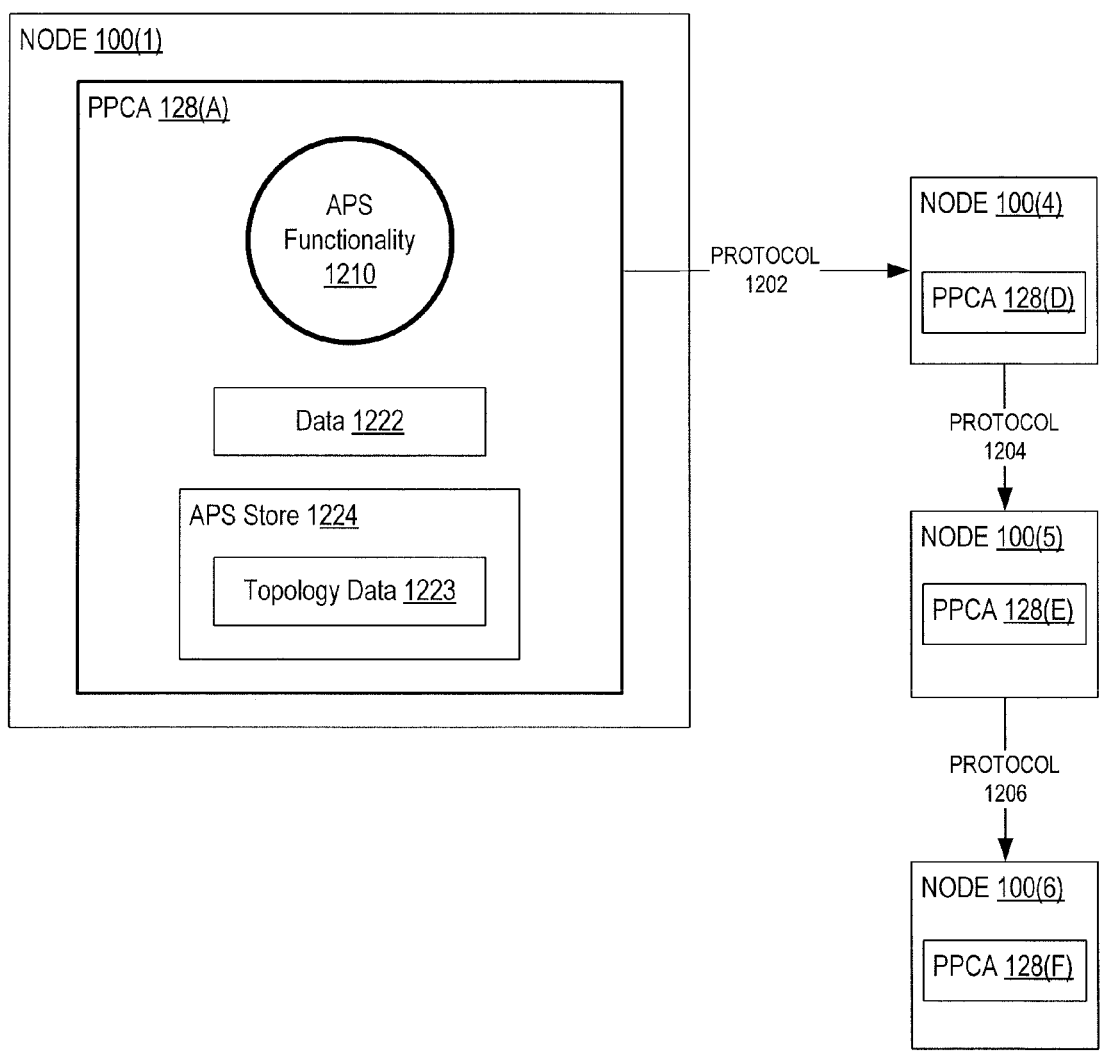

FIG. 12A shows one exemplary auto protocol selection enabled system.

Figure 12B:
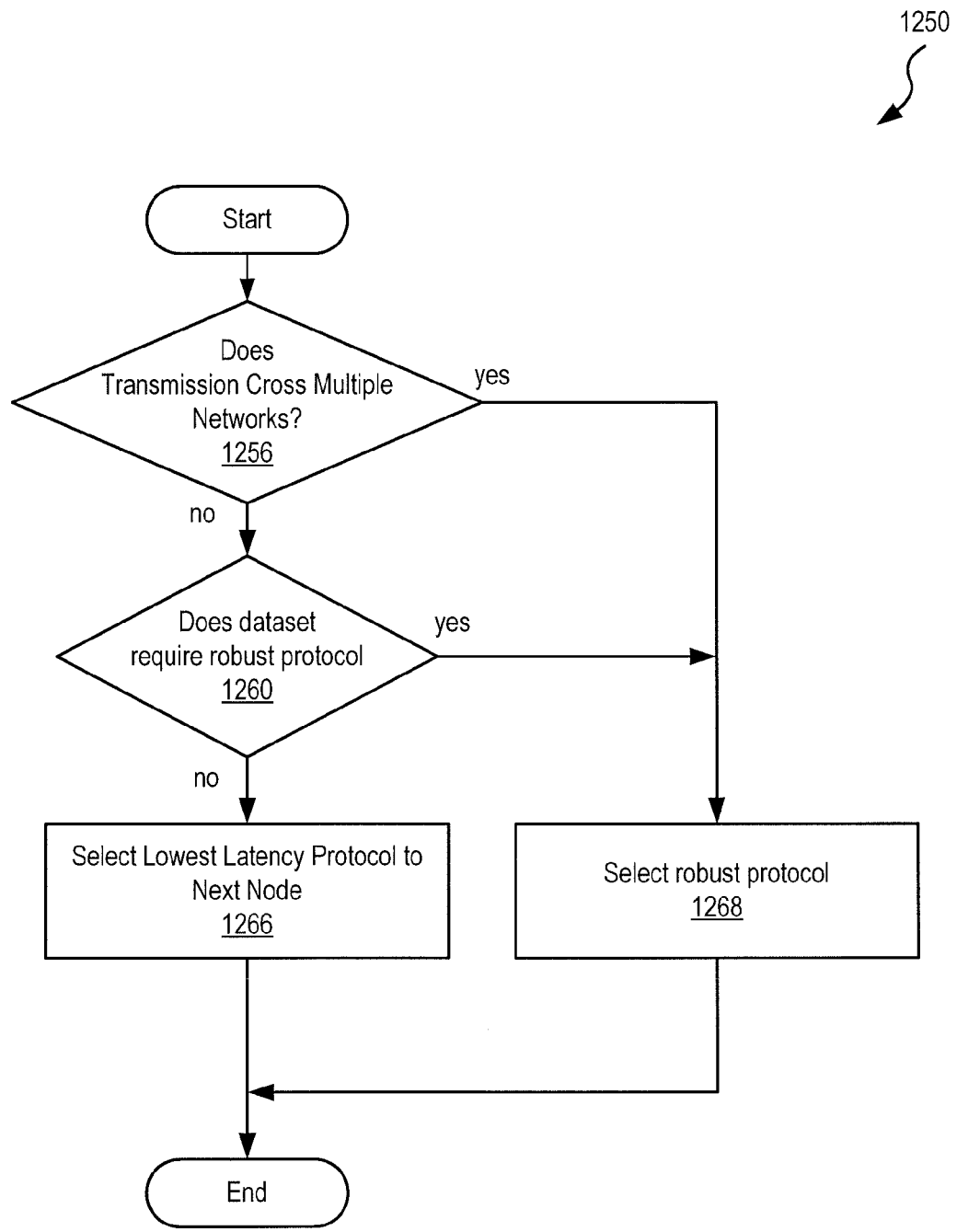

FIG. 12B is one exemplary auto protocol selection method.

Figure 13A:
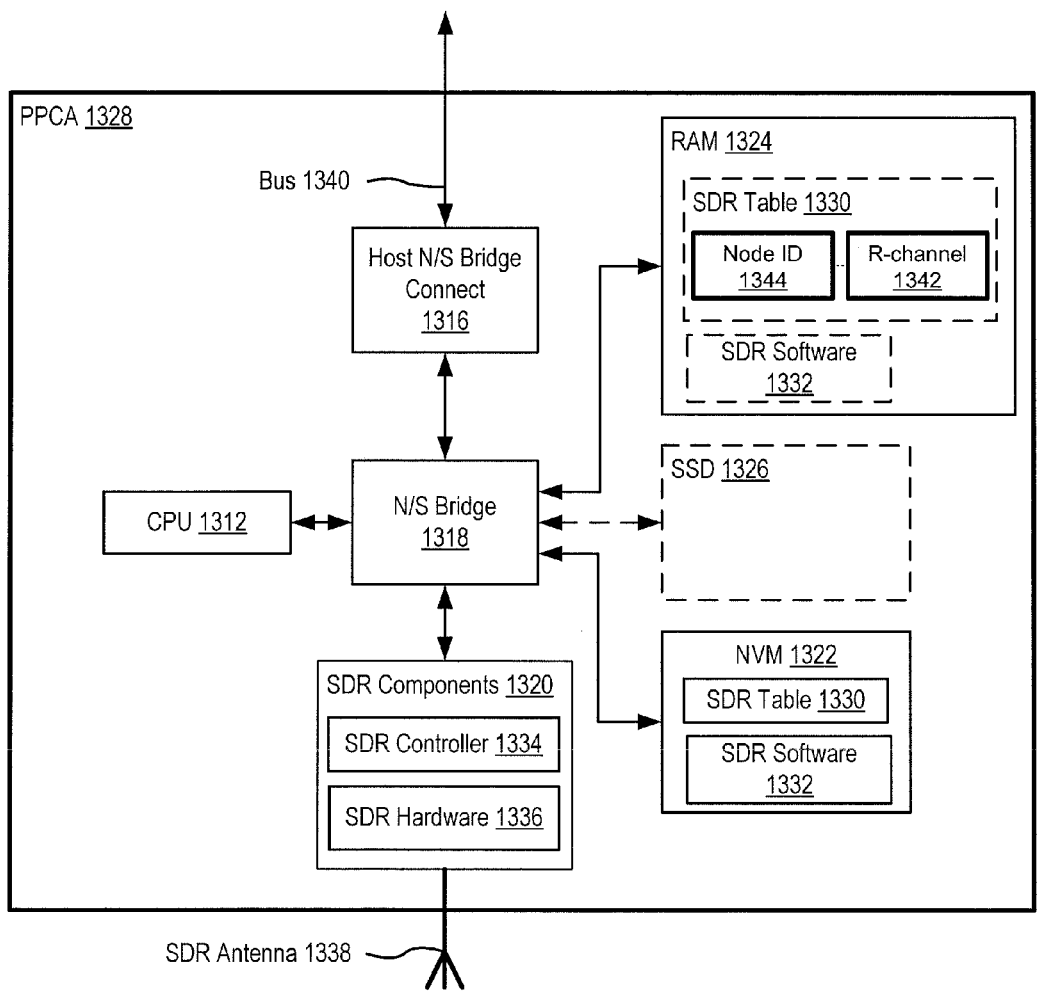

FIG. 13A is one exemplary software defined radio (SDR) enabled PPCA.

Figure 13B:
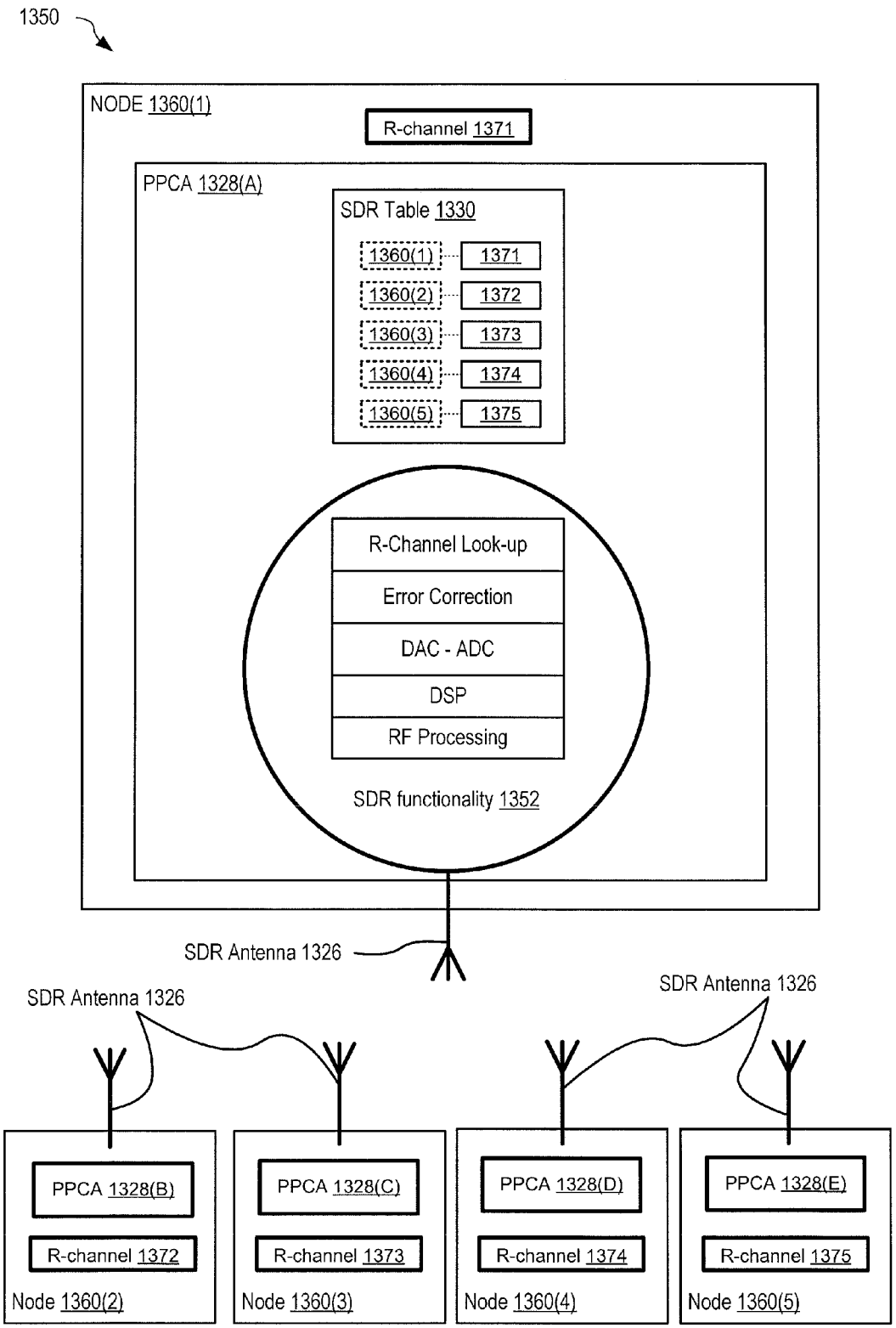

FIG. 13B is one exemplary SDR enabled system.

Figure 14:
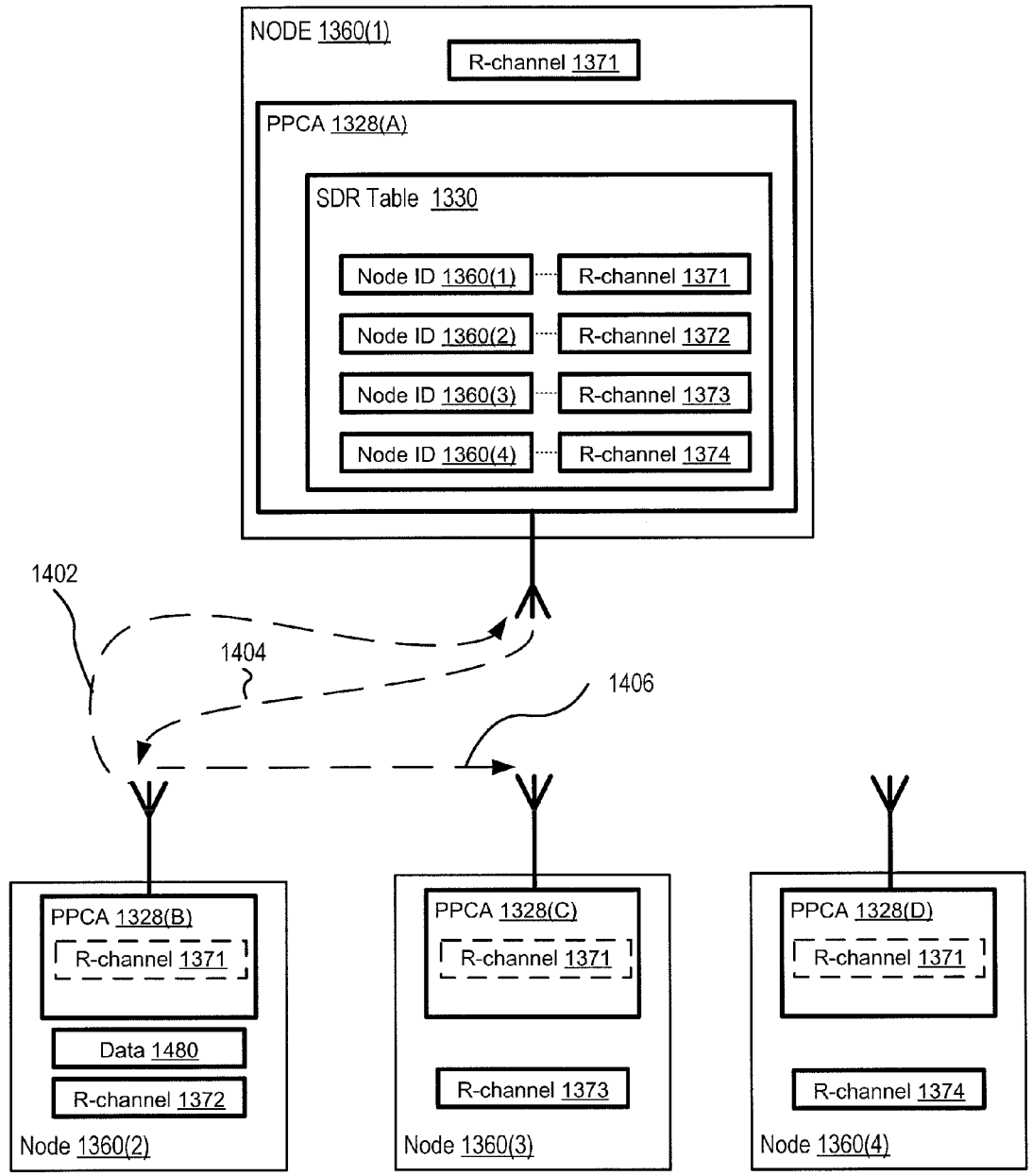

FIG. 14 shows one exemplary SDR fixed channel node assignment (FCNA) enabled system utilizing a centrally located r-channel look-up table.

Figure 15A:
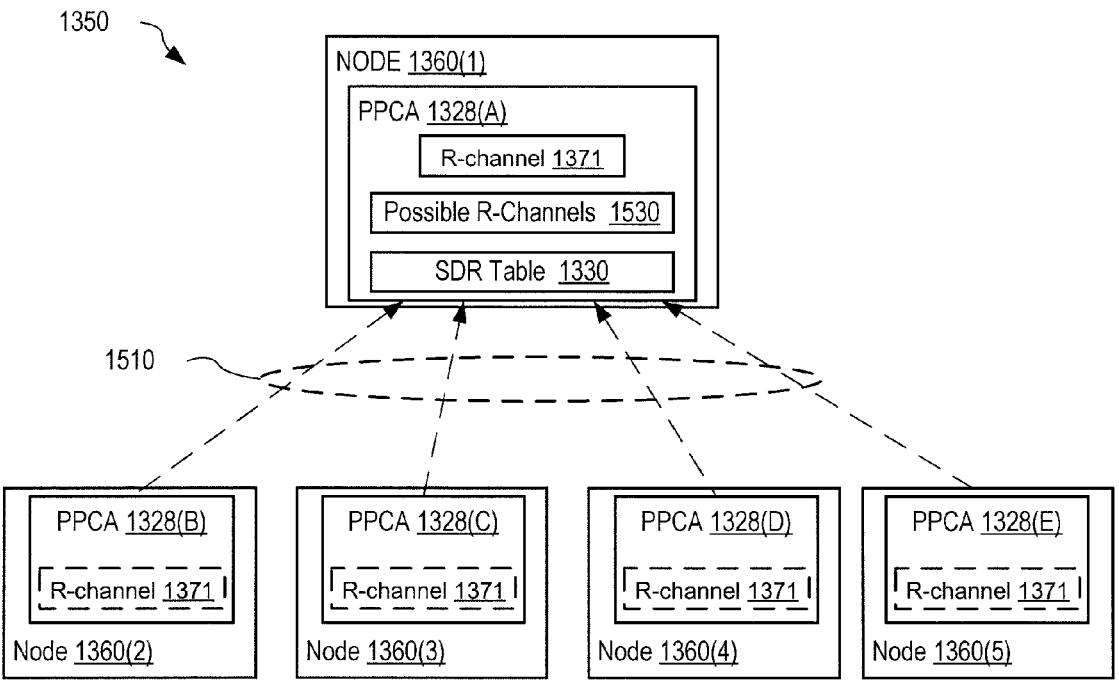

FIG. 15A shows one exemplary gather step for a SDR-FCNA enabled system utilizing a gather-scatter method for distributing a distributed r-channel look-up table.

Figure 15B:
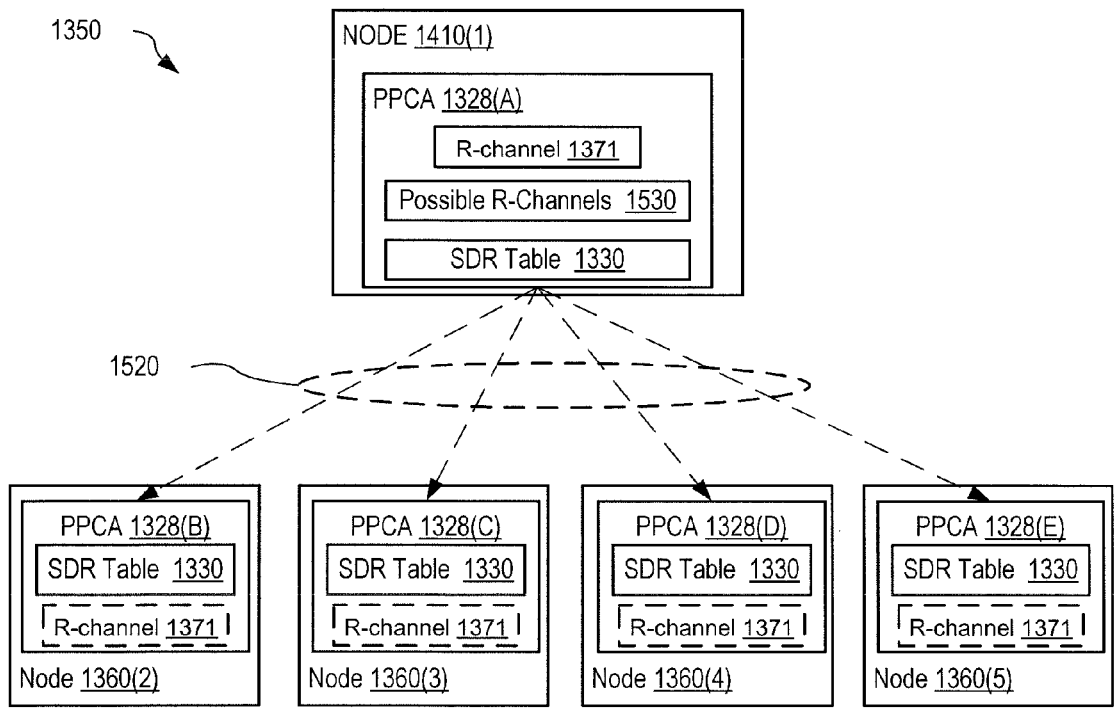

FIG. 15B shows one exemplary scatter step for a SDR-FCNA enabled system utilizing a gather-scatter method for distributing a distributed r-channel look-up table.

Figure 16:
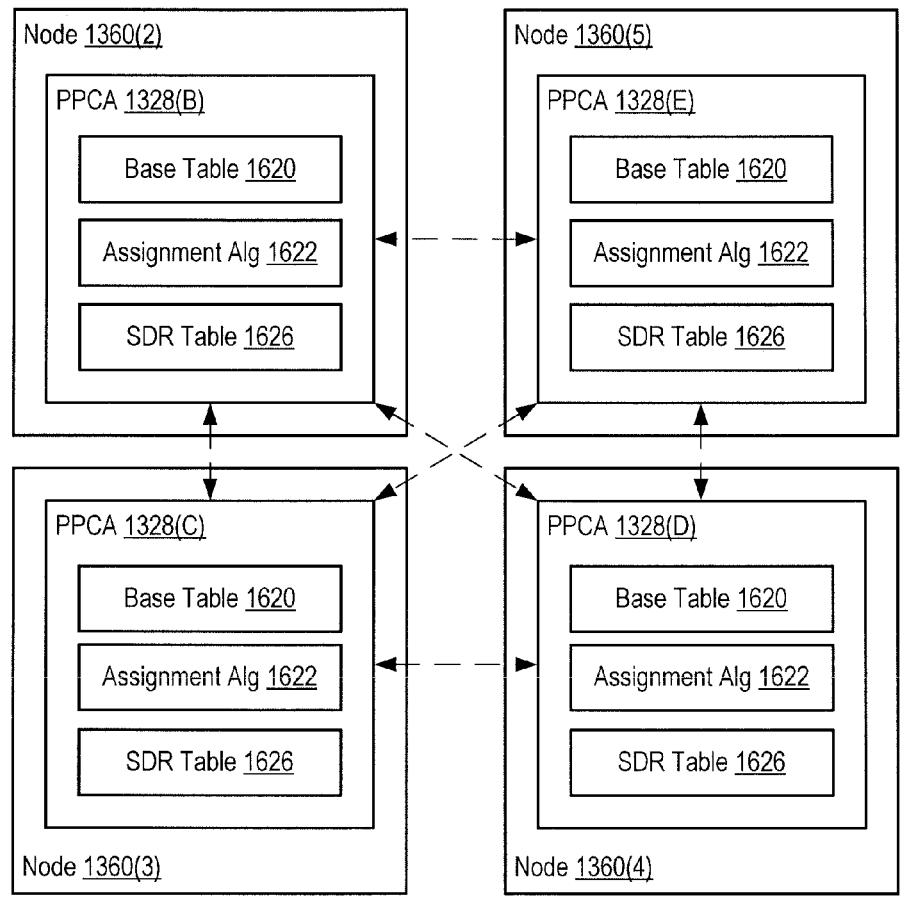

FIG. 16 shows one exemplary SDR-FCNA enabled system utilizing an all-to-all exchange method for distributing a distributed r-channel look-up table.

Figure 17:
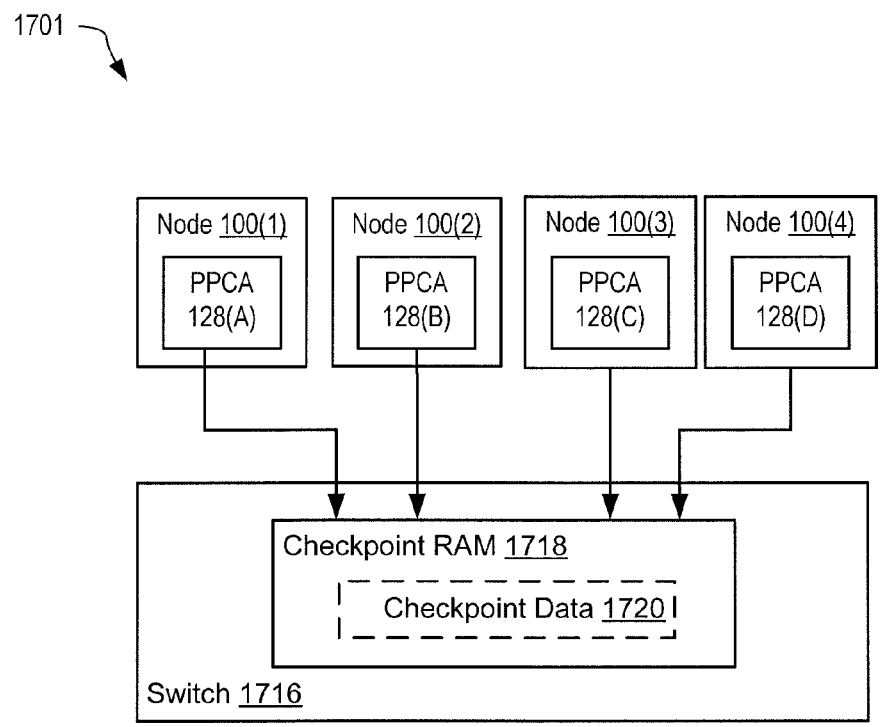

FIG. 17 shows one exemplary single time-step checkpoint/restart enabled system.

DETAILED DESCRIPTION OF THE EMBODIMENTS

In a parallel processing environment that includes a cluster having several computing nodes, a parallel computing task is divided into two or more sub-tasks, each of which are assigned to one or more of the computing nodes. A measure of efficiency of the parallel processing environment is the time taken to process the parallel computing task, and the time taken to process each sub-task within the compute nodes.

Each compute node includes one or more processors that process assigned tasks and sub-tasks in as short a time as possible. However, each computing node must also communicate with other computing nodes within the cluster to receive assigned sub-tasks and to return results from processing sub-tasks. This communication imposes an overhead within the compute node that can delay completion of the assigned sub-task. To reduce this delay, certain low-level operations may be devolved from the one or more processors of the computing node to a devolving engine. The devolving engine, in an embodiment, is located on an accelerator card having some functions similar to a network interface card (NIC) installed in the computing node and provides communication between networked computing nodes of the cluster. The devolving engine allows the host computer to offload low-level communication operations to the devolving engine while maintaining control of high-level operations and high-level communication decisions.

Figure 1:
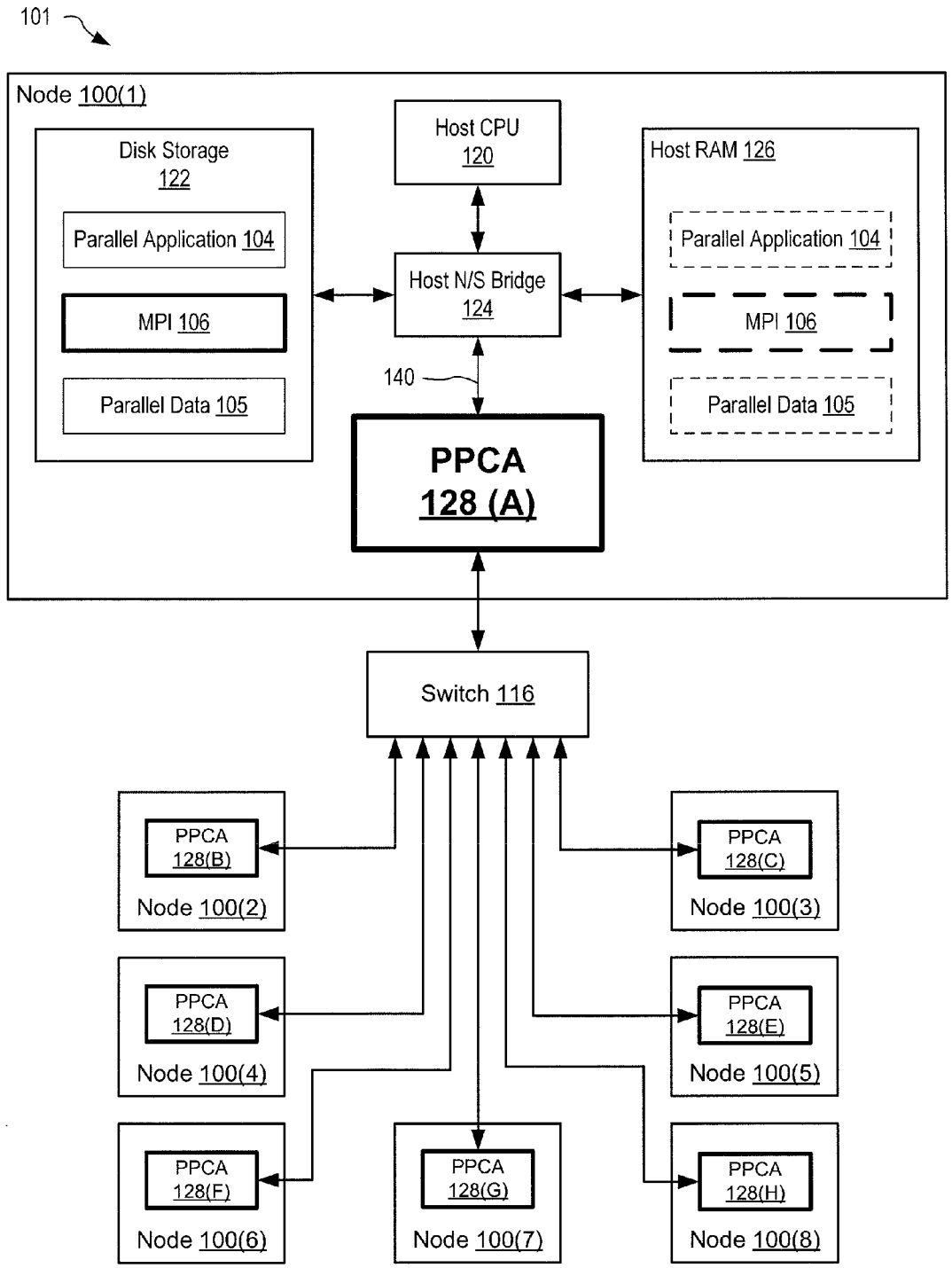
FIG. 1 shows exemplary apparatus for enhancing performance within parallel processing environment.

FIG. 1 shows an exemplary Parallel Processing Communication Accelerator (PPCA) 128 for enhancing performance within a parallel processing environment 101 formed of a plurality of computing nodes 100 and a switch 116. PPCA 128 is preferably included within each computing node 100 of environment 101.

In an embodiment, at least one of computing nodes 100 represents a host node as used within a Howard Cascade (see U.S. Pat. No. 6,857,004 incorporated herein by reference). In the example of FIG. 1, environment 101 has eight computing nodes 100(1-8) that communicate through switch 116. Environment 101 may have more or fewer nodes without departing from the scope hereof. Each node 100(1-8) includes a PPCA 128(A-H) that provides devolving and communication functionality.

In FIG. 1, only node 100(1) is shown in detail for clarity of illustration. Nodes 100 are similar to each other and may include components and functionality of conventional computer systems. For example, nodes 100 may also include components and functionality found in personal computers and servers. Node 100(1) has host central processing unit (CPU) 120, a host north/south (N/S) bridge 124, a host random access memory (RAM) 126, and disk storage 122. Nodes 100 may include other hardware and software, for example as found in personal computers and servers, without departing from the scope hereof.

Host N/S bridge 124 may support one or more busses within node 100 to provide communication between host CPU 120, disk storage 122, host RAM 126 and PPCA 128 (A). For example, host N/S bridge 124 may implement a bus 140 that allows one or more computer cards (e.g., graphics adapters, network interface cards, and the like) to be installed within node 100. In an embodiment, Bus 140 is a peripheral component interconnect express (PCIe). In the example of FIG. 1, PPCA 128 connects to bus 140 when installed within node 100, and provides a communication interface to communicate with other PPCA 128 equipped nodes 100 via switch 116.

When configured in the form of a PCIe card, PPCA 128 may be installed in a computer system supporting the PCIe bus to form node 100. Although PPCA 128 is shown connecting within node 100(1) using bus 140, PPCA 128 may be configured to connect to node 100(1) using other computer busses without departing from the scope hereof. In an alternate embodiment, PPCA 128 is incorporated into a motherboard of node 100.

Disk storage 122 is shown storing a parallel application 104, a message passing interface (MPI) 106 and parallel data 105. Disk storage 122 may store other information and functionality, such as an operating system, executable computer code, computational tasks, sub-tasks, sub-task results, computation task results, and other information and data of node 100, without departing from the scope hereof Parallel application 104 may represent a software program that includes instructions for processing parallel data 105. MPI 106 represents a software interface that provides communications for a parallel application 104 running on nodes 100 of environment 101. MPI 106 may include one or more interface routines that instruct PPCA 128 to perform one or more operations that provide communications between node 100(1) to other nodes 100, and may implement additional functionality, as described below.

CPU 112 is shown as a single processing unit, but CPU 112 may represent a plurality of processing units, for example, a central processing unit, an arithmetic logic unit and a floating-point unit.

In one example of operation, at least part of each of parallel application 104, MPI 106 and parallel data 105 are loaded into host RAM 126 for execution and/or access by host CPU 120. Parallel application 104, MPI 106 and parallel data 105 are illustratively shown in dashed outline within host RAM 126. Parallel data 105 may be all, or a portion of, a data set associated with a parallel processing task or sub-task. Host RAM 126 may store other programs, software routines, information and data for access by host CPU 120, without departing from the scope hereof.

In an embodiment where bus 140 is a PCIe bus with one or more card slots that accept PCIe format computer cards, PPCA 128 is a PCIe format computer card that plugs into one of these card slots. Further, PPCA 128 is configured to use one or more serial communication lanes of bus 140, and it is preferred that bus 140 provide sufficient serial communication lanes to match or exceed the requirements of PPCA 128. The greater the number of serial communication lanes used by PPCA 128, the greater the communication bandwidth between PPCA 128 and host N/S bridge 124.

PPCA 128 functions to devolve certain parallel processing tasks from host CPU 120 to PPCA 128, thereby increasing the availability of host CPU 120 for task processing. PPCA 128 provides enhanced communication performance between node 100 and switch 116, and in particular, provides enhance communication between nodes 100 of environment 101.

Figure 2:
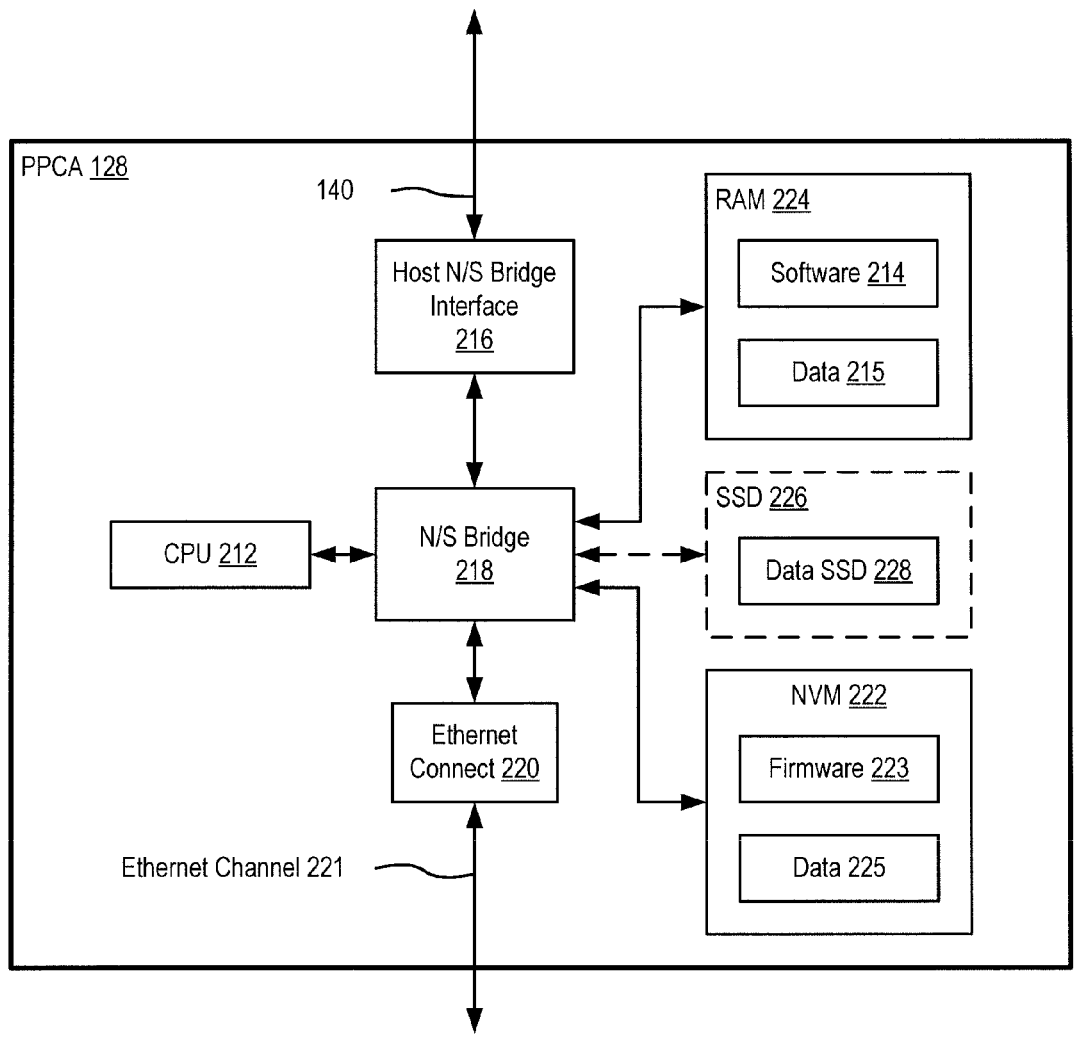
FIG. 2 shows the PPCA of FIG. 1 in further detail.

FIG. 2 illustrates PPCA 128 of FIG. 1 in further detail. PPCA 128 includes a Microprocessor Unit (MPU) 212, a N/S bridge 218, an Ethernet connect 220, a non-volatile memory (NVM) 222, and a random access memory (RAM) 224. PPCA 128 may also include a solid-state drive (SSD) 226. N/S Bridge 218 provides communication between MPU 212, host N/S bridge interface 216, Ethernet connect 220, NVM 222, RAM 224, and optional SSD 226. Host node connection, host N/S bridge interface 216, provides connectivity between N/S Bridge 218 and bus 140, thereby providing communication between PPCA 128 and components of node 100, into which PPCA 128 is installed and/or configured.

Parallel processing environment connection, Ethernet connect 220, connects to switch 116 via an Ethernet channel 221, which may be implemented as one or more of RJ45 connectors on category 5 Ethernet cable, category 6 cable, category 6a cable, a duplex channel, and a wireless connection, as known in the art.

NVM 222 contains firmware 223 that includes instructions, executable by MPU 212, for implementing functionality of PPCA 128. NVM 222 may represent a FLASH memory, a CMOS memory coupled with a 'keep-alive' battery. NVM 222 may also include data 225 for configuring PPCA 128 for operation within node 100. Firmware 223 and data 225 may be upgraded and/or augmented post-production (e.g., by an install and/or upgrade program (not shown) that runs within node 100). Firmware 223 has instructions, executable by MPU 212, to implement functionality as shown in one or more of MPI devolver 314, FIG. 3A, PPCA paging code 526, FIG. 5, compressor 1116, FIG. 11, comparator 1104. Firmware 223 may also include one or more device drivers for implementing protocols for communication between nodes 100 of parallel environment 101. Data 225 may include state data 412, FIG. 4A, described below. In an embodiment, at least part of firmware 223 and/or data 225 is loaded into NVM 222 during fabrication of PPCA 128.

MPU 212 is not limited to a micro-processing unit and represents a processing unit that is capable of processing PPCA 128 functionality, such as a central processing unit.

In one example of operation, at least part of firmware 223 is loaded into RAM 224 (shown as software 214) and executed by MPU 212. Data 225 may be loaded, at least in part, into RAM 224, shown as data 215. Data 215 may include information associated with node 100, e.g., information received during operation of PPCA 128 from one or more other nodes 100 via Ethernet channel 221.

Data 215 may include, at least in part, one or more of raw data 1120, FIG. 11, compressed data 1122, received data 1126, paging frame 514, FIG. 5, small data set 668, FIG. 6, metadata 603, cache 740, FIG. 7, self state 846, FIG. 8, other state 848, and PPCA paging code 526, described below.

Solid-state drive (SSD) 226 may represent one or more non-volatile data storage device(s) based on solid-state memory. In an embodiment, SSD 226 is an Intel® Z-P140 Solid State Drive. SSD 226 is shown storing data SSD 228 that may represent data sets (e.g., small data set 668, FIG. 6) that are too large for storage in RAM 224. PPCA 128 may include SSD 226 at time of manufacture, or SSD 226 may be added to PPCA 128 as a later upgrade, and may be external to PPCA 128.

Devolving

Figure 3A:
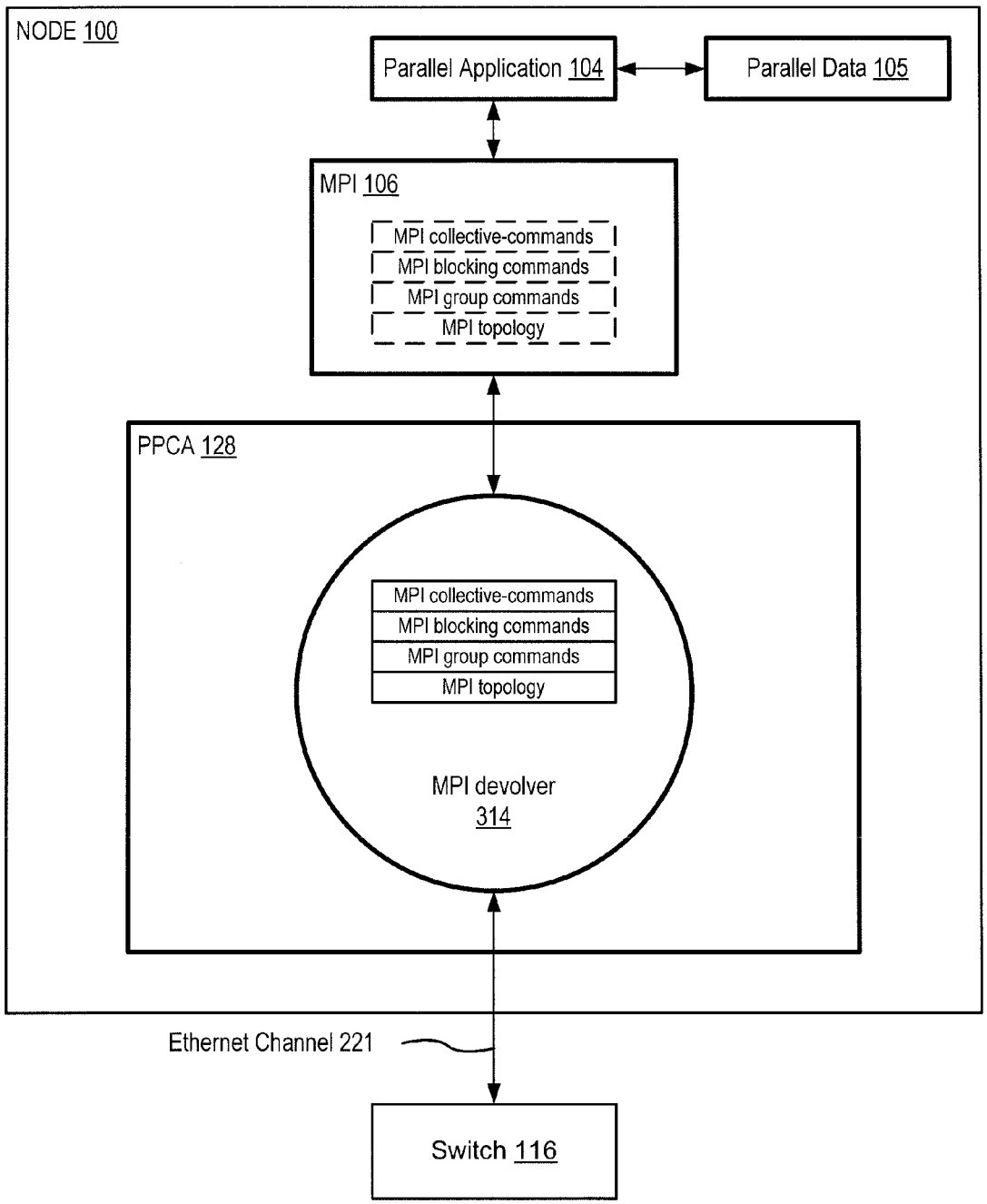
FIG. 3A shows one exemplary MPI devolver enabled system.

FIG. 3A is a illustrative representation of MPI 106 functionality devolved to a PPCA 128 supported MPI devolving engine, that is, MPI devolver 314. FIG. 3A shows parallel application 104 invoking PPCA 128, through MPI 106, to communicate with other instances of application 104 on nodes 100 via switch 116. MPI 106 is a language independent communication interface that facilitates communication between parallel applications 104 running on two or more nodes 100 of environment 101, FIG. 1. PPCA 128 includes an MPI devolver 314 that implements at least part of the functionality of MPI 106, such that this functionality is performed by MPU 212 of PPCA 128, thereby offloading processing from host CPU 120. MPI devolver 314 may be a module of firmware 223 stored within NVM 222 (FIG. 2) and transferred to RAM 224 as part of software 214 for execution by MPU 212.

Routines of MPI 106 devolve MPI functionality to PPCA 128, such that host CPU 120 returns to processing parallel application 104 with less delay than the prior art. In the prior art, MPI functionality is implemented by MPI routines invoked by a prior art parallel processing application and executed by the processor (i.e., the node processor) executing the parallel processing application, thereby suspending execution of the parallel processing application until the prior art MPI routine completes.

Conceptually, MPI 106 is similar to prior art MPIs, and provides a standardized interface to parallel application 104. Thus, an existing parallel processing application written for prior art MPIs requires little or no software modification to use MPI 106. For example, MPI 106 may support functionality of MPI-2 library, known in the art, and be optimized for use with PPCA 128. For example, MPI 106 interacts with MPI devolver 314 to invoke enhanced communication functionality of PPCA 128 to provide functionality of the MPI-2 library. Within MPI 106, functionality of prior art MPI collective commands are implemented by MPI 106 collective commands and functionality of MPI devolver 314 of PPCA 128.

Communication functionality of MPI 106 is devolved to MPI devolver 314 and communication latency of environment 101 is reduced since MPI devolver 314 handles certain low-level communication protocol interactions with switch 116 and/or other nodes 100 without involving host CPU 120. This reduces communication processing required of host CPU 120, and thereby increases availability of host CPU 120 for other processing (e.g. computational tasks), since the number of communication related interrupts and/or requests to host CPU 120 from PPCA 128 is reduced, and, in certain cases, substantially eliminated. PPCA 128 handles much of the low-level communication protocol and certain parts of the high-level communication protocol facilitated by MPI 106.

Some or all functionality of MPI 106, know in the art as the MPI-1.2, MPI-2, MPICH and MPICH-2 layer standards, are devolved to MPI devolver 314 of PPCA 128. MPI functionality devolved to PPCA 128 includes, but is not limited to, MPI collective-commands (e.g. MPI_REDUCE, MPI_ALL-REDUCE, MPI_SCATTER, etc.), MPI blocking commands (e.g. MPI_SEND, MPI_RECV, MPI_SEDRECV, MPI_WAITALL, etc.), MPI group commands (E.G. MPI_COMM_DUP, MPI_COMM_FREE, MPI_GROUP_DIFFERENCE, MPI_GROUP_RANGE_EXCL, etc.) and MPI topology (e.g. MPI_CART_CREATE, MPI_DIMS_CREATE etc.).

In many instances, processing and communication times depend on (1) the processing algorithm utilized and (2) the size of the dataset processed. In one example, an algorithm's work (and therefore processing time) increases as a square of the size of the dataset processed by the algorithm. By including functionality for overlapping communication and processing, the functionality hereafter called a Lambda Move, the total processing time of transmitting a dataset in a Howard Cascade can be reduced. By performing the Lambda Move (starting to send data from card A on a second communications link to card B, while card A is still receiving further packets of the same data on a first link (referenced as Lambda Move in paragraph 57), we can effectively bypass part of the time associated with passing data down multiple levels of a cascade. In terms of a Howard Cascade, this early transmission results produces a Lambda Step instead of a full timestep, where a full timestep is the time required for receiving an entire communication and commencing a relay to other nodes.

In an example, one megabyte of data takes 1 second to process, the data is transferred at 12.5 MB/s, the latency time is 0.0008 seconds, and 1 kilobytes worth of processed data is required before transmission of the processed data can start from a receive node (e.g., node 100(1)) back to a transmit node (e.g., node 100(2)). In another example, not illustrated, a one transmit node, one receive node, computer cluster has a bi-directional communication channel. First, a dataset is transmitted from the transmit node to the receive node in transmittable pieces. At the receive node, the received dataset pieces are stored in a first data store. Second, the receive node utilizes an algorithm to process each received dataset piece in the order that it arrives in the first data store.

Lambda Move functionality allows processing of the first received piece of the dataset prior to receiving the final piece of the dataset. Results of processing each piece of the dataset are output into a second data store. Using the above example, at least 1 kilobyte of processing result must exist within the second data store before transmission of the result from the receive node to the transmit node may commence. The receive node transmits each solution piece back to the transmit node in the order the result are added to the second data store. The final result piece is transmitted when complete, even if it is less that 1 kilobyte. After the final result piece is received by the transmit node, a complete solution is agglomerated. In this process, the receive node may receive data, process data, and transmit data simultaneously, thereby reducing latency, work and the amount of time require to arrive at a solution. The Lambda Move functionality may be extend to a cluster having a greater number of nodes, for example, formed as a Howard Cascade.

Figure 2A:
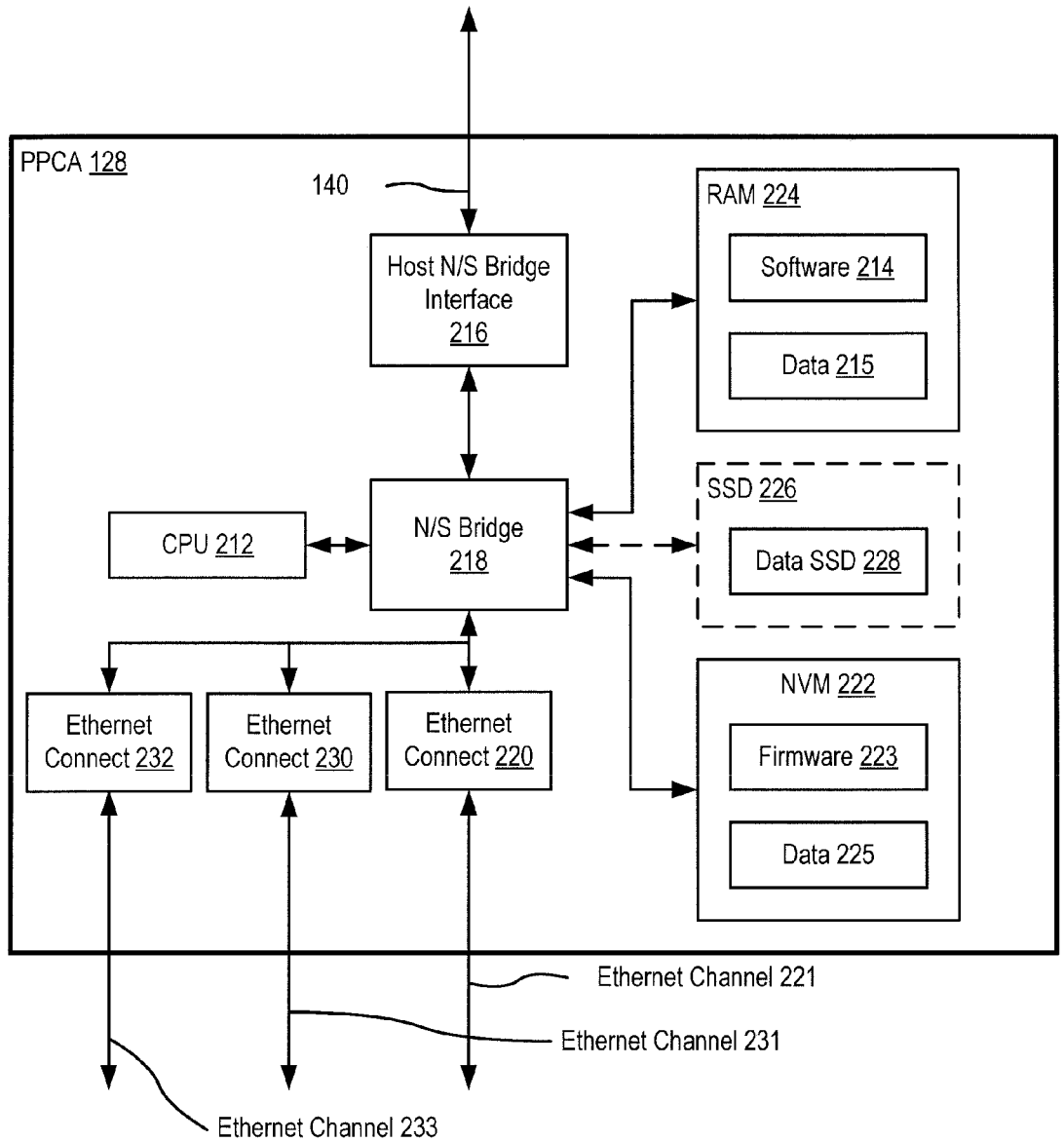
FIG. 2A shows an alternative embodiment of the PPCA of FIG. 2.

In embodiments having Ethernet connects 220 capable of full-duplex operation and equipped with full switches 116 instead of hubs, a Lambda Move may operate over a single Ethernet channel 221 with small interference due to acknowledgment packets In an alternative embodiment of the PPCA, as illustrated in FIG. 2A, and otherwise resembling the embodiment of FIG. 2, one, two, three or more additional Ethernet connects 230, 232 and channels 231, 233 are provided on the PPCA. Ethernet connects 230, 232 and channels 231, 233 resemble, and may operate concurrently with, Ethernet connect 220 and Ethernet channel 221. In these embodiments, in order to achieve a Lambda step, a Lambda Move function may operate while receiving data on Ethernet channel 221 and transmitting data on Ethernet channel 231. A double Lambda step may be achieved by performing a Lambda move while receiving data on channel 221 and transmitting data on Ethernet channel 231 and 233.

Figure 2B:
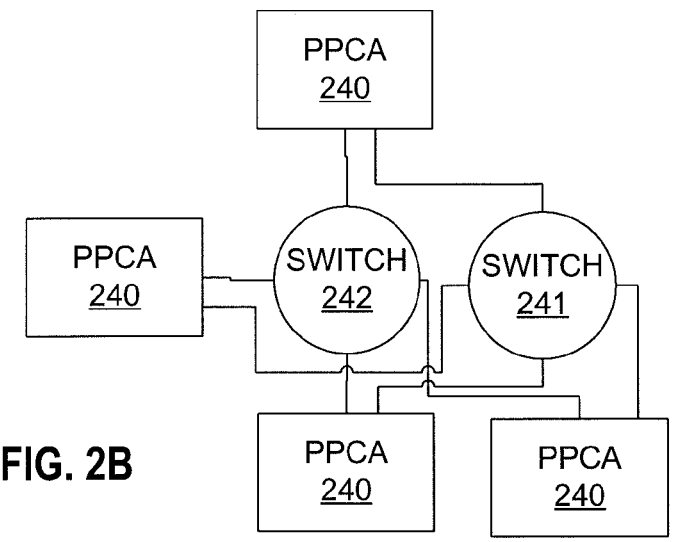
FIG. 2B shows an embodiment of a system using the PPCA of FIG. 2A coupled in parallel-star configuration.

In an embodiment, the additional Ethernet channels are coupled through duplicate switches 116 to each node of the machine as a second, third, fourth, or other additional, parallel, Star-configured, interconnect to provide high bandwidth communications between nodes. In such an embodiment illustrated in FIG. 2B, each node 240 couples to two or more switches 241, 242.

Figure 2C:
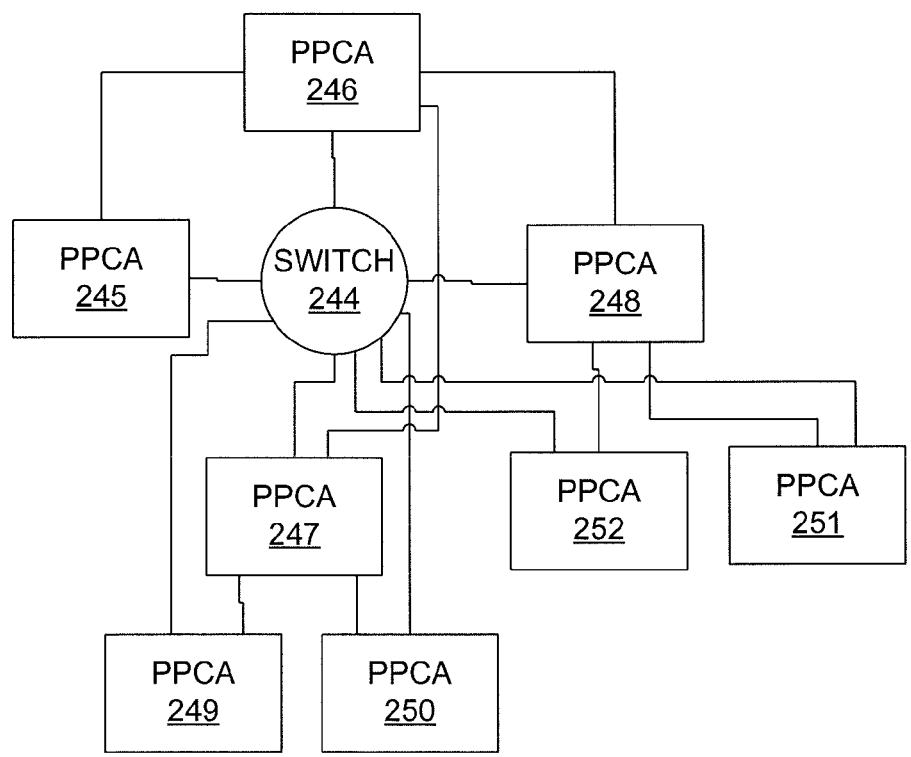
FIG. 2C shows an embodiment of a system using the PPCA of FIG. 2A with one port of each PPCA in star configuration to a switch, and three or more ports coupled in tree configuration.

In an alternative embodiment, having three or more additional Ethernet connects 230, 232, a first Ethernet channel 221 is connected in star configuration so all nodes of a system can receive broadcast commands, and additional Ethernet connects 230, 232, are coupled together in a tree structure as illustrated in FIG. 2C. In the embodiment of FIG. 2C, Switch 244 couples to all nodes of the system, while node 245 couples to node 246, node 246 couples to nodes 247 and 248, node 247 couples to nodes 249 and 250, and node 248 couples to nodes 251 and 252.

In another alternative embodiment, Ethernet channel 221 is connected as an uplink towards an access node of nodes coupled in a tree structure, and additional Ethernet connects 230, 232 are coupled as downlinks in tree structure. An embodiment of this type may be visualized as resembling the embodiment of FIG. 2C with switch 244 removed.

Figure 3B:
FIG. 3B shows one exemplary chart comparing estimated completion time of MPI collective operations between a one exemplary PPCA, utilizing a PPCA optimized MPI library, and a standard 10 Gb/s NIC, utilizing a standard MPI library.

FIG. 3B is a chart 350 comparing an estimated completion time 374, 384 of MPI collective operations 360 between a one exemplary PPCA utilizing MPI library 370 and a prior art 10 Gb/s NIC utilizing a prior art MPI library 380. By comparing estimated complete time 374 with estimated complete time 384 for each MPI collective operation 360, it can be seen that the estimated complete times for a PPCA 128 utilizing an MPI 106 library are much shorter for each MPI collective operation as compared to the prior art.

Low Latency Protocol Selection

Figure 4A:
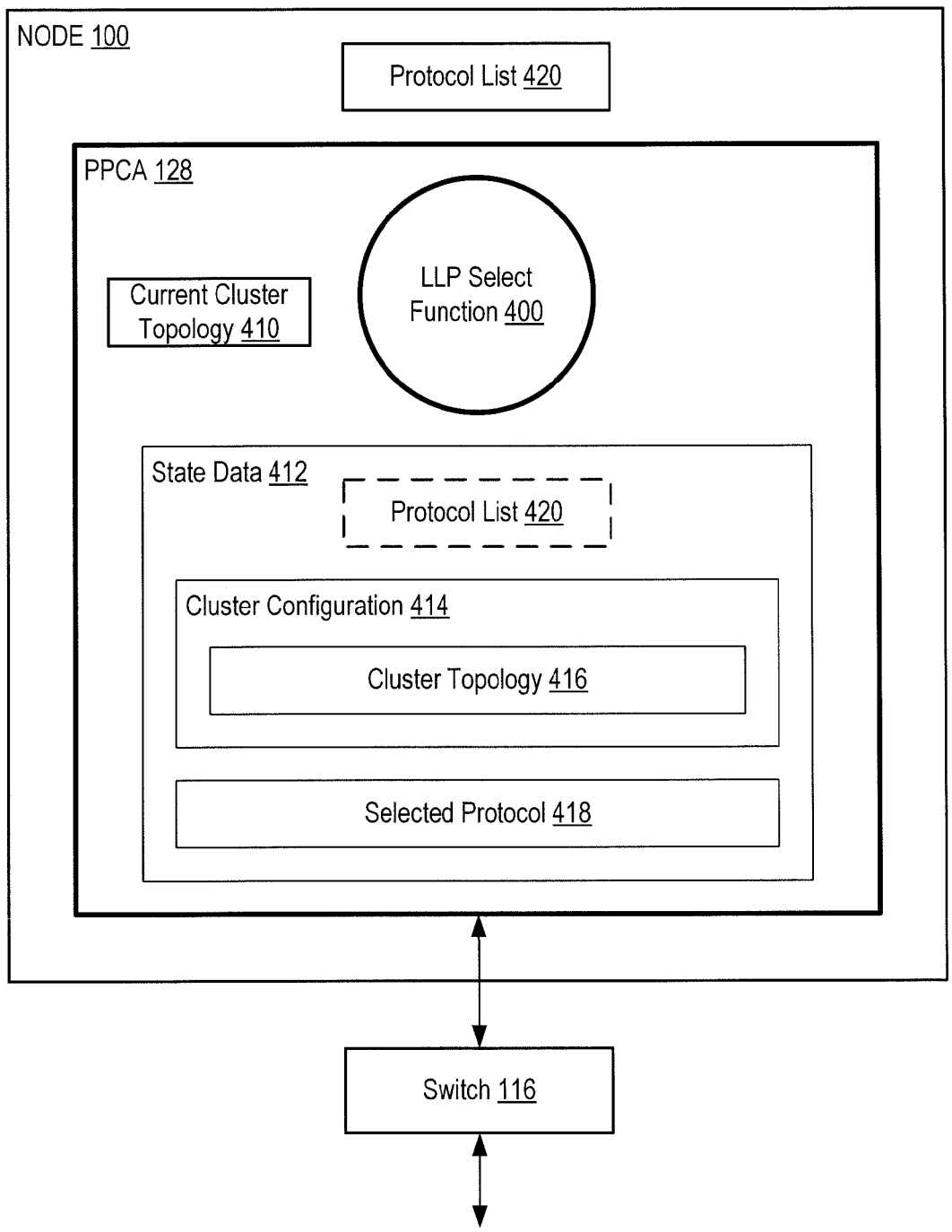
FIG. 4A shows one exemplary low latency protocol (LLP) enabled system.
Figure 4B:
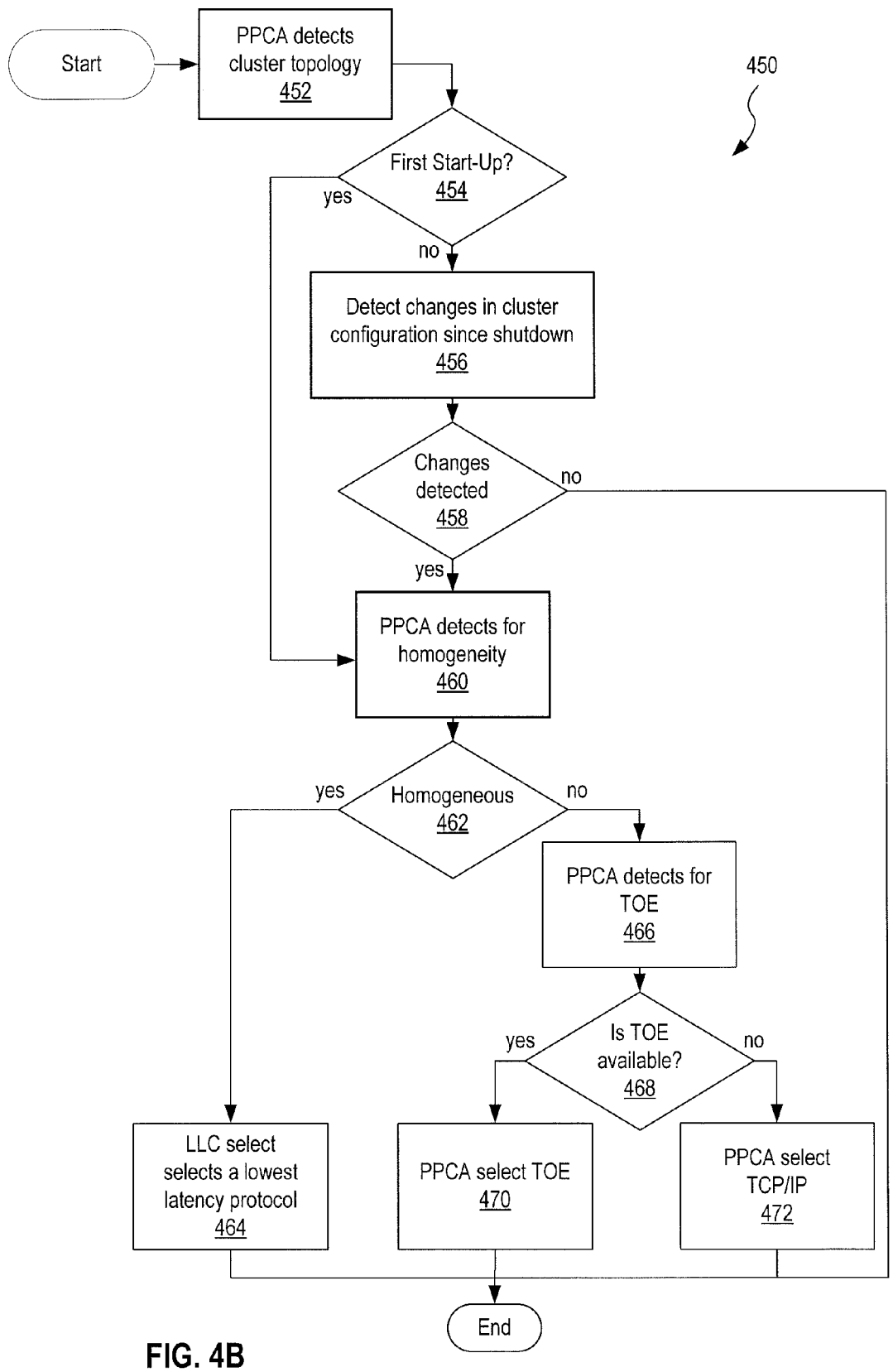
FIG. 4B shows one exemplary low latency protocol (LLP) selection method.

FIG. 4A shows one exemplary automatic low latency protocol (LLP) selection function 400 of PPCA 128 for selecting a lowest latency communication protocol for use between nodes 100 of environment 101. FIG. 4B is a flowchart illustrating one exemplary LLP selection process 450 of LLP-select function 400 for automatically selecting a lowest latency communication protocol for use between nodes 100 of environment 101. FIGS. 4A and 4B are best viewed together with the following description.

Within node 100, a protocol list 420 identifies communication protocols supported by node 100 that may be automatically selected by PPCA 128. In an embodiment, protocol list 420 is stored in disk storage 122 of node 100 and transferred to PPCA 128 at startup of node 100 and/or PPCA 128. Within environment 101, each node 100 specifies supported communication protocols based upon known network topology, and protocol list 420 may vary from node to node. Protocol list 420 may be loaded from node 100(1) into state data 412 during startup of PPCA 128 and/or at each operation of LLP select function 400. State data 412 represents a data structure that may be stored in NVM 222. LLP select function 400 determines configuration of nodes 100 within environment 101 and may store this information for later use. In the example of FIG. 4A, LLP select function 400 stores determined configuration information of environment 101 within state data 412 as cluster configuration 414. Cluster configuration 414 includes a cluster topology 416 representing the topology of nodes 100 of environment 101. Upon operation of LLP select function 400, state data 412 is modified to reflect changes to environment 101; including changes to protocol list 420.

Exemplary communication protocols for use between nodes 100, and listed in protocol list 420, include: Communication on LInux Cluster (CLIC), Active Pages, Genoa Active Message MAchine (GAMMA), TCP/IP offload engine (TOE), and Active Ports. CLIC is a fast communication for Linux clusters. CLIC is embedded in a Linux kernel, provides an interface to the user applications, and reduces the number of protocol layers. Active Ports is a Windows NT/2000/XP program that enables a user to monitor all open TCP/IP and UDP ports on a local computer (e.g. node 100). Active Ports maps ports to one or more applications, and displays a local and remote IP address for each connection. GAMMA is an active ports based protocol. GAMMA reduces latency by decreasing the software overhead and the number of memory copies. Another protocol, Active Messages, supports a variety of parallel programming models, including message passing, shared memory and dataflow.

LLP select function 400, using information of protocol list 420, determines an LLP available to all nodes 100 of environment 101. LLP select function 400 implements low latency protocol selection process 450, for example, and may be implemented as instructions stored in NVM 222 that are moved to RAM 224 for execution by MPU 212.

LLP select function 400 stores the determined LLP as selected protocol 418 within state data 412. Selected protocol 418 and cluster configuration 414 are recalled by PPCA 128 upon reboot. LLP select function 400 also maintains current cluster topology 410, which represents the most recently determined topology of environment 101 and topology information, for example, latency between nodes 100. LLP select function 400 compares current cluster topology 410 to cluster topology 416 to determine changes to environment 101. Current cluster topology 410 and cluster topology 416 may each include one or more of node count, switch count, and communication connection types.

Upon start-up and/or a configuration change of parallel processing environment 101, LLP select function 400, implementing LLP selection process 450 for example, selects a lowest latency inter-node communication protocol for environment 101. For example, at startup of PPCA 128, LLP select function 400 is executed to interact with one or more other PPCA 128 of environment 101 to determine a best LLP that is common to all nodes 100.

In step 452, process 450 detects cluster topology. In one example of step 452, each PPCA 128 of environment 101 participates in an all-to-all exchange of at least part of state data 412 to determine current topology of environment 101. Each PPCA 128 records the determined current topology of environment 101 as current cluster topology 410. In another example of step 452, LLP select function 400 broadcasts a topology interrogation request to all other nodes 100 via switch 116, and each receiving PPCA 128 responds with its network address and node identification. Using the example environment 101 of FIG. 1, if PPCA 128(A) broadcasts the topology interrogation request, PPCAs 128(B)-(H) would each receive the request, and would each respond with their network address and associated node identification. PPCA 128 then stores each node identification and network address as current cluster topology 410. Other topology determination methods, known in the art, may be used to determine current topology of environment 101.

Where nodes are not equipped with PPCA 128, prior art communication methods may be used to transmit topology information, similar to state data 412, to other nodes within the computer cluster. Although PPCA 128 is not present in all nodes, a LLP with latency lower than those implemented by TOE may still be selected.

Step 454 is a decision. If, in step 454, process 450 determines that this is the first execution of process 450 within PPCA 128, process 450 continues with step 460; otherwise, process 450 continues with step 456. In one example of step 454, where state data 412 is initialized to null during manufacture of PPCA 128, LLP select function 400 determines if cluster configuration 414 and/or selected protocol 418 are null. In another example of step 454, LLP select function 400 determines whether a cluster topology 416 and selected protocol 418 have been previously determined and stored within state data 412.

In step 456, process 450 detects changes in environment 101 since the previous determination of the topology of environment 101. In one example of step 456, LLP select function 400 compares cluster topology 416, stored in state data 412, to current cluster topology 410. Where parallel environment 101 is modified, for example by addition and/or removal of one or more switches (e.g., switch 116), nodes 100 and/or PPCAs 128 within nodes 100, or by changes to connectivity between one or more switches and one or more nodes, LLP select function 400 detects such modification within step 456. LLP selection function 400 may run to detect and respond to changes within environment 101 that occur after start-up of environment 101, which may eliminate any need to reboot environment 101 when adding or modifying one or more nodes, switches, PPCA cards, etc.

Step 458 is a decision. If, in step 458, process 450 determines that configuration changes have occurred within parallel environment 101, process 450 continues with step 460; otherwise, process 450 terminates.

In step 460, process 450 detects homogeneity of PPCA 128 within nodes 100 of parallel environment 101. In one example of step 460, where each node 100 of parallel environment 101 utilizes PPCA 128 for inter-node communication, LLP select function 400 determines that PPCA 128 is homogenous within parallel environment 101.

Step 462 is a decision. If in step 462, process 450 determines that parallel environment 101 utilizes PPCA 128 homogeneously, process 450 continues with step 464; otherwise, process 450 continues with step 466.

In step 464, process 450 selects a low latency protocol for PPCA based connectivity, since communication between all nodes 100 of parallel environment 101 is implemented by PPCA 128. The protocol selection criteria may be based also on the computer architecture, operating system, and protocols of other nodes 100 of parallel environment 101. Process 450 then terminates. Examples of low latency protocols are CLIK and Active Pages. In one example of steps 462-464, PPCA 128(A) checks current cluster topology 410 for PPCA 128 homogeneity within environment 101. If PPCA 128(A) finds that each node 100 has a PPCA 128, PPCA 128(A) selects the LLP shared by each node 100. As each PPCA 128 of environment 101 shares the same current cluster topology 410, as described in process step 452, each PPCA 128 selects the same LLP.

In step 466, process 450 determined whether TCP/IP offload engine (TOE) functionality is provided for all nodes 100 of parallel environment 101. In one example of step 466, PPCA 128 utilizes TCP code to determine if all nodes 100 support TOE functionality.

Step 468 is a decision. If, in step 468, process 450 determines that TOE protocol is supported by all node inter-communication devices, process 450 continues with step 470; otherwise, process 450 continues with step 472.

In step 470, process 450 selects TOE protocol such that all nodes 100 of parallel environment 101 utilize the same communication protocol, even though certain nodes may have additional functionality provided by PPCA 128. Process 450 then terminates.

In step 472, process 450 selects a TCP/IP protocol for communication between nodes 100 of parallel environment 101. In one example of step 472, LLP select function 400 selects TCP/IP for communication with other nodes of parallel environment 101, thereby utilizing the same protocol between nodes irrespective of communication capability.

In one example of steps 466-472, all PPCAs 128 determine if TOE protocol is available to each node 100 by checking protocol data stored in current cluster topology 410. If TOE protocol is available to all nodes 100, each PPCA 128 selects TOE protocol as the LLP for environment 101. If TOE protocol is not available to each node 100, each PPCA 128 selects TCP/IP protocol as the LLP for environment 101, as TCP/IP is assumed to exist on all nodes 100. As a result of the all-to-all exchange described in step 452, each PPCA 128 has the same protocol data stored in current cluster topology 410, thereby each PPCA 128 performs the same protocol determination process and selects at the same LLP.

If, during the LLP selection process 450, TOE protocol is selected, the compression capabilities, as described in FIG. 11, may be used on data transferred between nodes utilizing PPCA 128 for communication.

In another embodiment, parallel environment 101 is implemented with a holographic checkpoint restart capability, detailed further in FIGS. 10A and 10B. A holographic checkpoint restart-enabled computer cluster has active nodes and spare nodes. Active nodes are nodes that are currently participating in the parallel processing task. Spare nodes are nodes held in reserve for use as replacements of failed active nodes or for new tasks. In an initial configuration of parallel environment 101, environment 101 may select nodes that do not have a PPCA 128, or nodes with high latency, to be spare nodes, while designating nodes with PPCA 128 as active nodes. In one example of a modified version of step 460, detecting the homogeneity of PPCA 128 usage is done by detecting homogeneity of PPCA 128 usage among the subset of active nodes (i.e. not including potentially higher latency spare nodes) of parallel environment 101, such that a lower latency parallel environment 101 may be formed. In one example, parallel environment 101 consists of nodes 100(1)-100(8) (nodes 100(2)-100(8) are not shown in FIG. 4A for sake of illustrative clarity), where nodes 100(1)-100(7) each have a PPCA 128. Node 100(8) is a non-TOE enabled node that does not have a PPCA 128. If, for example, node 100(7) is selected as the spare node for environment 101, process 450 will select TCP/IP as the LLP for environment 101, as determined by steps 462-472 of FIG. 4B. If node 100(8) is selected as the spare node, process 450 will select the LLP shared by each PPCA 128 enabled node 100(1)-100(7) as determined by steps 462-464 of FIG. 4B.

Selected protocol 418 is used by parallel environment 101, but may be overridden later by an auto protocol detection process 1250, FIG. 12B.

PPCA Paging

For a computationally challenging problem that is also a data intensive problem, the ability to scale is often associated with the amount of random access memory (RAM) available to each of the servers. If the data for a given problem cannot fit on all of the nodes of a computer cluster attempting to run that problem then the problem cannot be run on that cluster. The total amount of RAM per server is typically augmented through virtual memory using paging, a method well known in the art. Paging uses a portion of the server RAM to store paging frames that may be mapped into program and data address spaces of the server. Data within these paging frames may also be transferred to and from a rotating disk or other such storage device. Where, data is swapped (or paged) out to the rotating disk, a latency in retrieving that data occurs due to the rotational speed and transfer rate of that media. Specifically, the data access speed associated with a rotating disk is orders-of-magnitude slower than access speed of data in the server's RAM. Thus, when data is paged to the non RAM storage device, access to that data is reduced and server performance decreases. This decrease in performance may limit true scaling of data intensive problems on multiple processors, even if the problem is written to take advantage if parallel computing.

Figure 5:
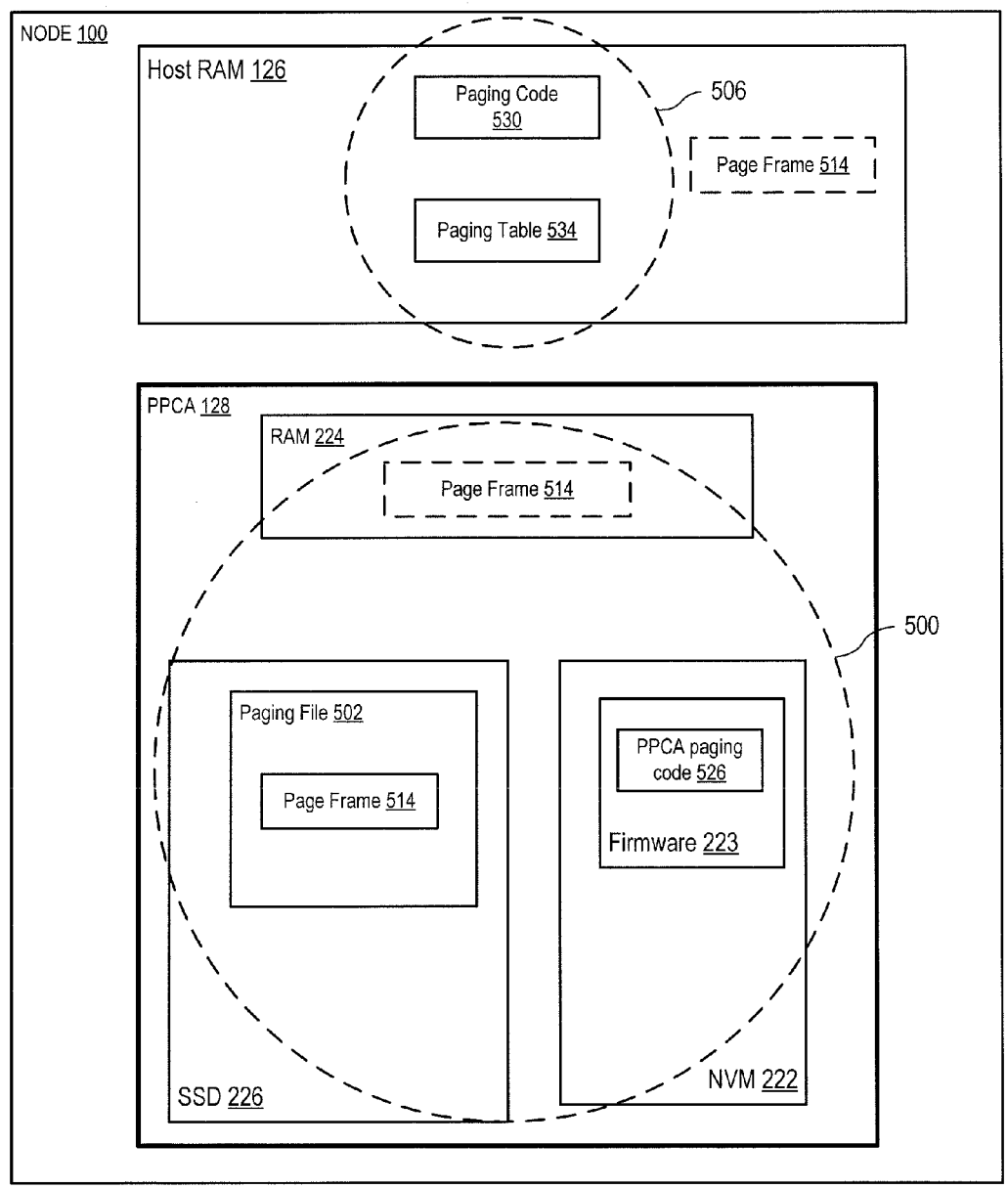
FIG. 5 shows one exemplary PPCA based paging enabled system.

FIG. 5 shows exemplary PPCA based paging functionality 500 of PPCA 128 within node 100. PPCA based paging functionality 500 provides fast solid-state drive (SSD) paging for increased performance of node 100 and parallel environment 101.

PPCA 128 facilitates paging within node 100 between host RAM 126 and SSD 226. Since access to SSD 226 is faster than conventional hard disk storage 122, performance of node 100 is improved. In particular, SSD 226 does not incur a seek time of hard disk drives, and is not limited to data transfer rates that result from platter rotation speed and head number of hard drives. PPCA 128 connects to node 100 through bus 140 and the Northbridge of host N/S bridge 124 and thus further benefits from high-speed data transfer rates that are superior to those of disk storage 122, which attaches to the slower Southbridge of host N/S Bridge 124.

Node paging functionality 506, for example under control of an operating system of node 100, implements paging between host RAM 126 and PPCA 128 and includes paging code 530 and a node page table 534. Paging code 530 represents instructions loaded into host RAM 126 and executed by host CPU 120 to utilize paging table 534 to implement paging between host RAM 126 and PPCA 128. Paging code 530 may represent new code or may represent a modified version of node 100's original paging code, and is optimized for PPCA 128 based paging. Within PPCA 128, PPCA paging code 526 cooperates with paging code 530 to store and retrieve paged frames (e.g. page frame 514) and to transfer the data between host RAM 126 and one or both of RAM 224 and SSD 226.

PPCA paging code 526 is shown stored within NVM 222, and may be loaded into RAM 224 and executed by PPCA MPU 212 to implement PPCA based paging functionality 500. In particular, page frame 514 may be buffered (e.g., cached) within RAM 224 and stored within a paging file 502 of SSD 226. In an alternative embodiment, PPCA paging code 526 emulates a standard hard disk drive using SSD 226, such that SSD 226 appears as a hard drive to the operating system of node 100 and paging file 502 appears as a paging file. In an alternate embodiment, paging file 502 represents an allocated memory area of SSD 226 and PPCA paging code 526 operates to store and retrieve page frames (e.g., page frame 514) by interfacing with paging code 530.

Virtual Disk Array

In the prior art, a virtual disk array provides storage for a network and is formed of a metadata server and two or more data servers that connect to the network. The metadata server provides data tracking as to which data server contains which parts of the stored data. A computer connected to the network requests data from the metadata server, which determines the location of the data, retrieves the data from each of the identified data servers, and then returns the requested data to the computer.

Figure 6:
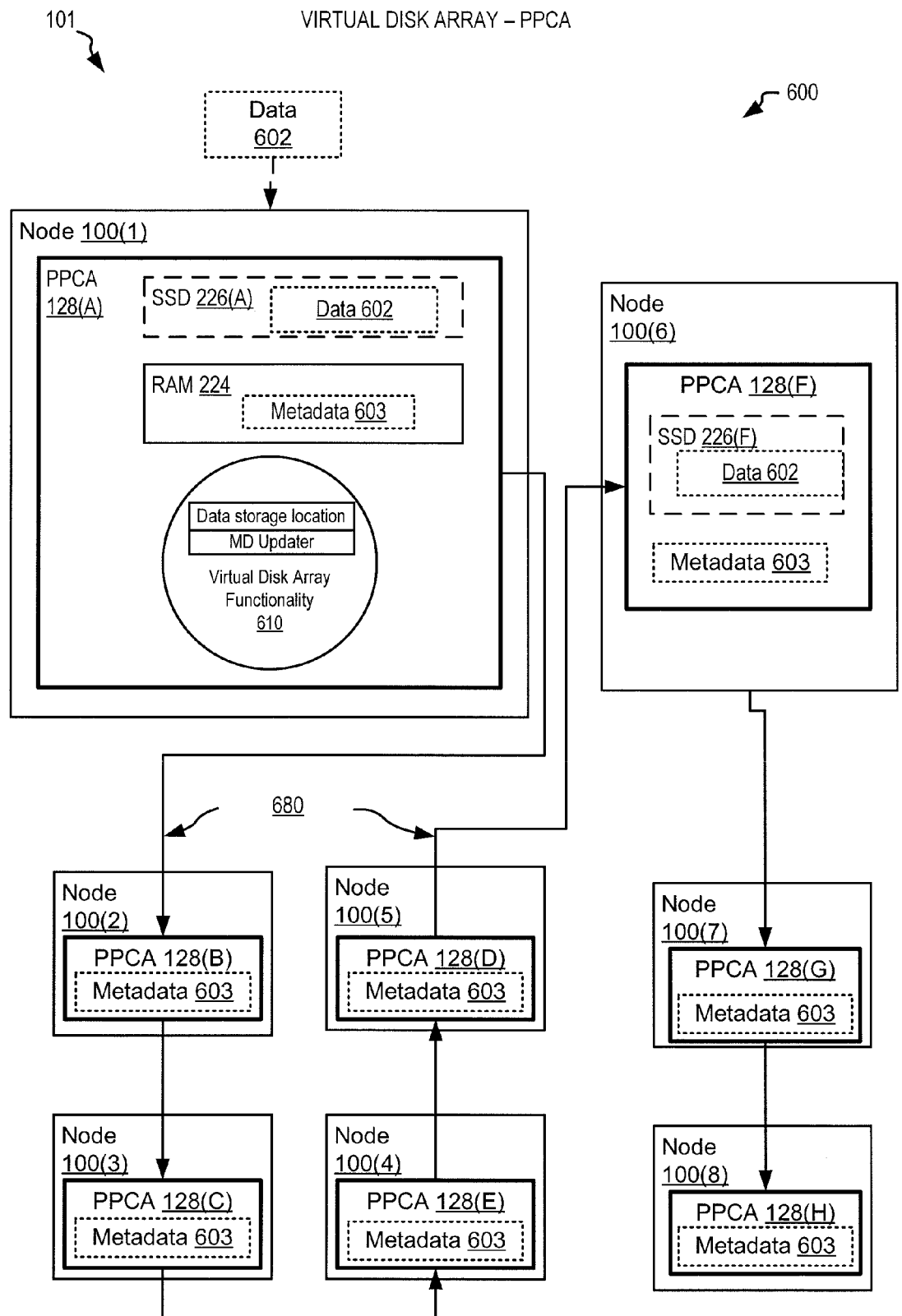
FIG. 6 shows the parallel processing environment of FIG. 1 implementing a virtual disk array (VDA) using the PPCA within each of nodes.

FIG. 6 shows a virtual disk array (VDA) 600 implemented by PPCA 128 within each of a plurality of nodes 100 of environment 101. VDA 600 implements distributed data storage, mapping and retrieval within environment 101. In FIG. 6, switch 116 is not shown for clarity of illustration and connecting lines 680 represent data flow and not necessarily physical connections between nodes 100.

Unlike the prior art, VDA 600 has no specific data server or metadata server. Rather, each PPCA 128 includes VDA functionality 610 that implements VDA 600 using storage of at least two PPCAs 128. Storage capability of VDA 600 is dependent upon the number of PPCA 128 utilized therein and the amount of storage available on each of these PPCA 128. In one example, each PPCA 128 of environment 101 includes SSD 226 and is used to implement VDA 600. In another example, data 602 is small and fits within RAM 224 such that SSD 226 is not used (e.g., in embodiments of PPCA 128 that do not include SSD 126). That is, PPCA 128 implements storage for VDA 600 within RAM 224. Storage capacity utilized for VDA 600 within each PPCA 128 may vary without departing from the scope hereof. Data 602 may be stored within RAM 224 within one or both of PPCA 128(A) and PPCA 128(F), without departing from the scope hereof. VDA 600 may utilize any number of storage array schemes, including the well known Redundant Array of Independent Disks (RAID) type schemes, without departing from the scope herein.

For example, in an environment having one thousand nodes, each including a PPCA 128 with a 32 Giga-Byte SSD 226, VDA 600 has a potential storage capacity of 16 terabytes, assuming data is 100% duplicated within the virtual disk array for redundancy and reliability. In another example, only certain nodes of environment 101 are used to implement VDA 600. Redundancy and reliability may be varied (e.g., by writing data 602 to fewer or more PPCA 128 within environment 101) without departing from the scope hereof.

Data 602 may represent parallel data for processing by environment 101, such as a 3-D image to be rendered or financial data to be calculated. In one example, data 602 represents the entire data set for a parallel processing task of environment 101. In another example, data 602 represents part of a data set for a parallel processing task of environment 101, such that other parts of the data set are similarly stored within other nodes of environment 101.

In one example of operation, data 602 is received by node 100(1) for storage within VDA 600. Within node 100(1), VDA functionality 610 within PPCA 128(A) stores data 602 within SSD 226(A) and, for redundancy and reliability, forwards data 602 to node 100(6) for storage within SSD 226(F) of PPCA 128(F). VDA functionality 610 updates metadata 603 (illustratively shown within RAM 224, but optionally stored within SSD 226(A)) to define the stored location of data 602 within VDA 600. VDA functionality 610 within PPCA 128(A) then propagates (optionally utilizing unique communication models, detailed further below) metadata 603 to other PPCA 128 implementing VDA 600, such that VDA functionality 610 within each PPCA 128 may determine the location of data 602 (and any other data stored within VDA 600). Metadata 603 may also define the number and network address of each PPCA 128 implementing VDA 600, such that VDA functionality 610 may determine storage availability within VDA 600 and thereby determine appropriate locations for storing data 602. For example, where SSD 222(A) is full, VDA functionality 610 may determine other nodes of VDA 600 for storing data 602, and automatically forward data 602 to these nodes.

Metadata 603 may be propagated using communication models supported by PPCA 128 and environment 101. In one example, where nodes 100 of environment 101 are formed as a Howard Cascade, one or more of a Lambda move, a Lambda exchange, a serial Lambda exchange, and an all-to-all exchange, are used to propagate metadata 603. The use of one or more of the Lambda move, the Lambda exchange, the serial Lambda exchange, and the all-to-all exchange greatly increases the effective bandwidth of the communication channels between nodes 100.

Where redundancy is implemented within VDA 600, network data bottlenecks may be avoided. In the example of FIG. 6, where node 100(5) requests data 602 to be retrieved from VDA 600, VDA functionality 610 of PPCA 128(D) uses metadata 603 to determine a first location of data 602 (node 100(1) in this example). If node 100(1) is busy, or communication with node 100(1) is not immediately possible, node 100(5) may use metadata 603 to determine that data 602 is also stored on node 100(6), and thereby request data 602 from PPCA 128(F). Further, since each PPCA 128 of VDA 600 includes VDA functionality 610 and metadata 603, no specific metadata server must be contacted when storing and/or retrieving data, thereby avoiding metadata server bottlenecks of the prior art.

In an embodiment, VDA functionality 610 may automatically select one or both of SSD 226 and RAM 224 for storing data 602. VDA functionality 610 may use a predefined and/or determined (e.g., based upon size of RAM 224 and SSD 226) size threshold for determining whether data 602 may be stored within RAM 224 or within SSD 226.

A further advantage of VDA 600 is that data storage capacity increases as the number of nodes supporting VDA increases. No additional servers are required to implement VDA 600, and since VDA 600 is implemented within PPCA 128, impact resulting from VDA 600 to processing capacity of nodes 100 is minimal.

Network Attached Device Caching

Figure 7A:
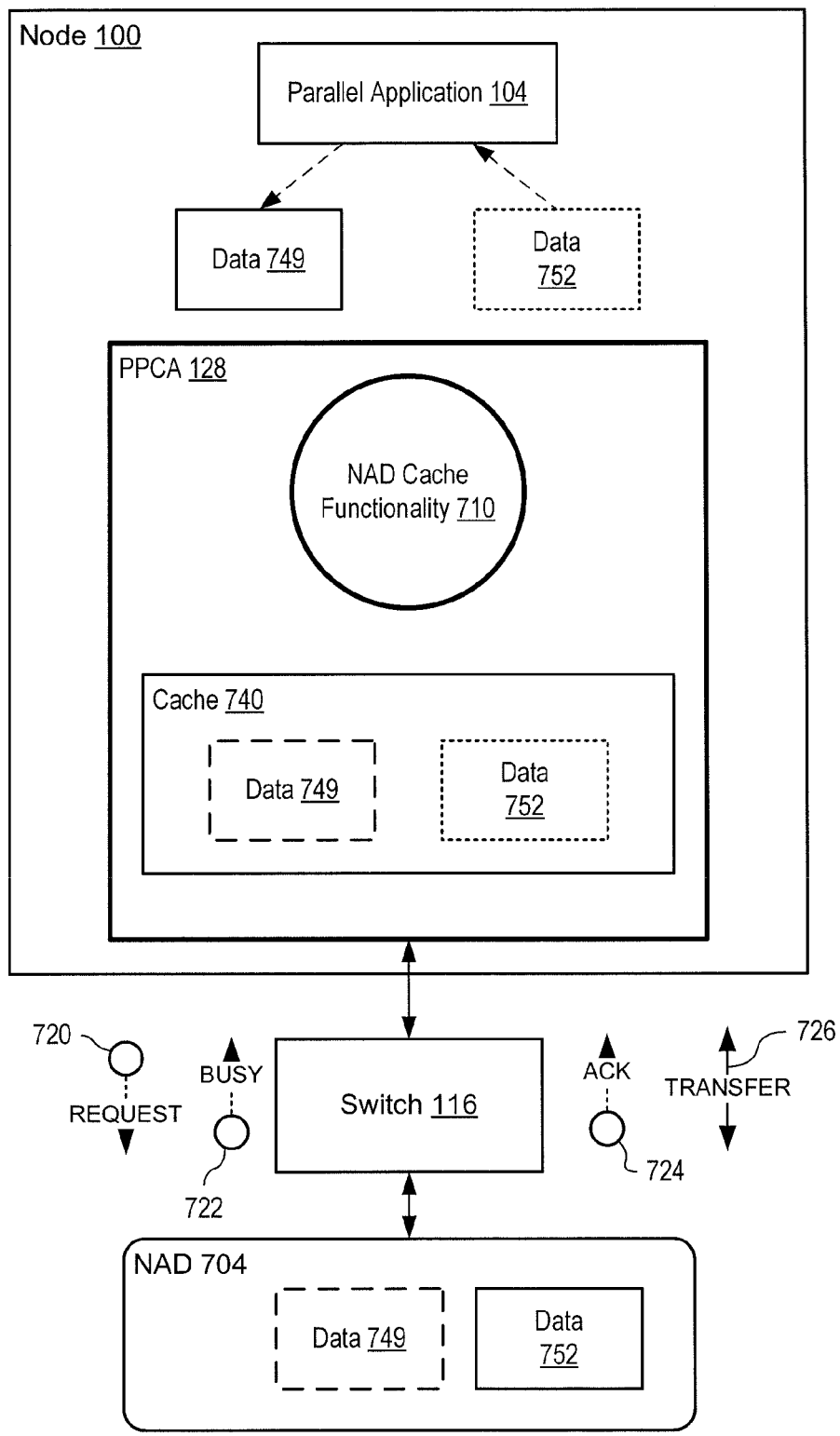
FIG. 7A shows one exemplary network attached device (NAD) caching enabled system.
Figure 7B:
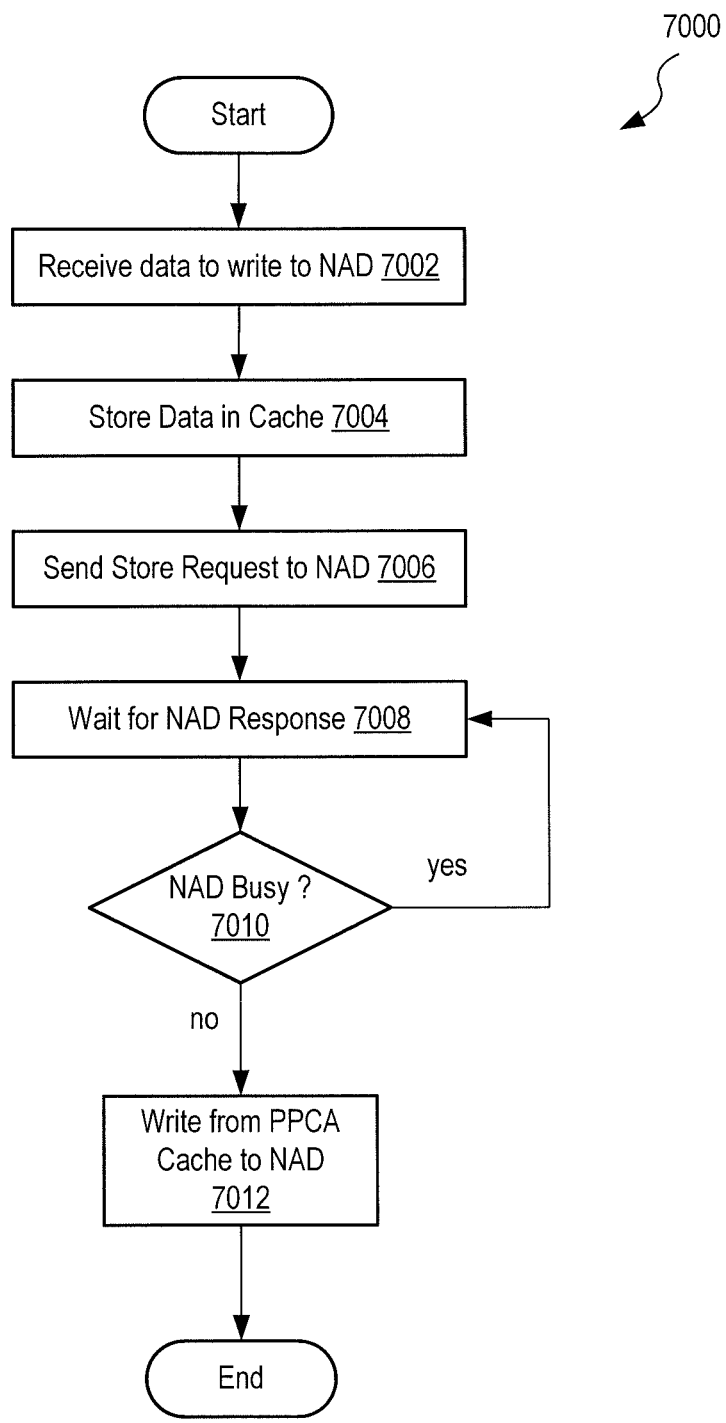
FIG. 7B shows one exemplary NAD caching method.

FIG. 7A shows exemplary network-attached device (NAD) cache functionality 710 of PPCA 128 for caching data between node 100 and a NAD 704. FIG. 7B shows one exemplary process 7000 implementing NAD cache functionality 710 within PPCA 128. FIGS. 7A and 7B are best viewed together with the following description.

NAD cache functionality 710 may represent instructions, stored in NVM 222 and loaded to RAM 224 for execution by PPCA MPU 212 that implement process 7000. NAD 704 may represent one or more of a file-level computer data storage device, a storage area network (SAN) device and a network-attached storage (NAS) device, or any other type of network storage device that connects to one or more of nodes 100 of environment 101 via switch 116. NAD cache functionality 710 utilizes a cache 740, implemented within one or both of RAM 224 and SSD 226, for storing data written to, and/or data read from, NAD 704.

In one example of operation, parallel application 104, running within node 100, utilizes MPI 106 (FIGS. 1 and 3A) to write data 749 to NAD 704. PPCA 128 receives (step 7002) data 749 from parallel application 104, and stores (step 7004) data 749 in cache 740. Once data 749 is cached within PPCA 128, parallel application 104 continues without interacting directly with NAD 704 since NAD cache functionality 710 of PPCA 128 communicates with NAD 704. Upon receiving data 749, PPCA 128 sends (step 7006) a store request 720 to NAD 704 requesting to store data 749, and then waits (step 7008) for a response from NAD 704. NAD cache functionality 710 determines (step 7010) whether NAD 704 has returned a busy 722 indication 722 that indicated that NAD 704 is handling a data access for another node 100, for example. PPCA 128 then waits (by returning to step 7008) for NAD 704 to indicate that it is ready to handle the request from PPCA 128. In an alternate embodiment, NAD cache functionality 710 periodically polls NAD 704 to request status while waiting for NAD 704 to become available for storing data 749. Upon receiving an acknowledge indication 724 from NAD 704, NAD cache functionality 710 initiates a write (step 7012) of data 749 to NAD 704. More or fewer interactions with NAD 704 may be made by NAD cache functionality 710 without departing from the scope hereof. For example, NAD cache functionality 710 may receive a store complete indication from NAD 704 once data 749 had been stored within NAD 704.

In another example of operation, parallel application 104 uses MPI 106 and NAD cache functionality 710 of PPCA 128 to retrieve data 752 from NAD 704. NAD cache functionality 710 receives the retrieve request from parallel application 104 and checks to see if a valid copy of data 752 is stored within cache 740. For example, if data 752 was previously written by node 100 to NAD 704, and data 752 has not been modified by other nodes 100 of environment 101, data 752 within cache 740 is assumed valid and is immediately returned to application 104 from cache 740. Otherwise, NAD cache functionality 710 sends a read request to NAD 704 requesting data 752. NAD cache functionality 710 then waits for NAD 704 to indicate that it is ready to transfer data 752, receives data 752 and may immediately transfer data 752 to parallel application 104. Optionally, data 752 may be stored within cache 740 to prevent delay to NAD 704 resulting from slow or intermittent transfer of data 752 to parallel application 104.

Process 7000 may include other steps for handling error conditions returned by NAD 704, without departing from the scope hereof. For example, PPCA 128 may process errors, correct errors when possible, notify parallel application 104 (and/or an operator) that an error has occurred and stop and/or terminate process 7000 if necessary. Examples of possible errors are hardware malfunction and loss of network connectivity.

Holographic Checkpoint and Failure Recovery

Within a parallel processing system, such as environment 101, it is desirable to have periodic checkpoints that save the state of the operational system such that recovery from failure of one node within the cluster is possible without having to restart the entire application from scratch. Additional detail of checkpoint functionality can be found in International Application Number PCT/US2005/016407, filed May 11, 2005, incorporated herein by reference. Additionally, a holographic checkpoint operation may be utilized, for example, in the situation where a first task (e.g., a long-term task) must be interrupted for the processing of a second task (e.g., a shorter-term task or higher priority task). At the completion of the second task, the holographic checkpoint operation restarts the first task.

Figure 8:
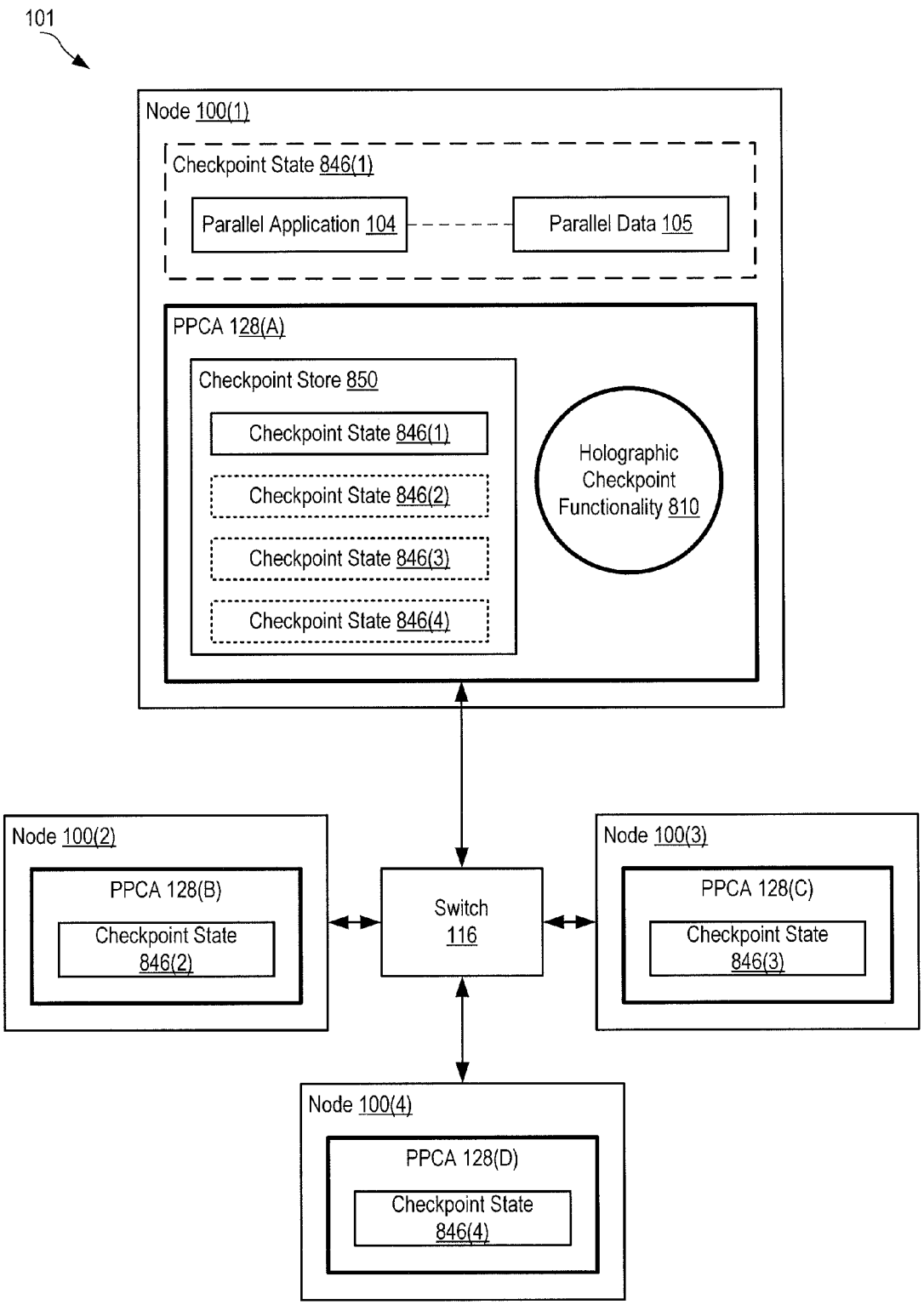
FIG. 8 illustrates one step in one exemplary all-to-all exchange in a holographic checkpoint enabled parallel processing environment with one detailed node.

FIG. 8 shows environment 101 with four exemplary nodes 100, each with a PPCA 128 having exemplary master-less holographic checkpoint functionality 810 that provides backup and restore functionality to each node. Holographic checkpoint functionality 810 may represent instruction, stored in NVM 222 that are loaded into RAM 224 for execution by MPU 212. For each node 100 utilized to process parallel application 104 and parallel data 105, PPCA 128 stores checkpoint state information 846 within a checkpoint store 850. Checkpoint store 850 may be implemented by one or both of RAM 224 and SSD 226 of PPCA 128. Where PPCA 128 does not include SSD 224, checkpoint store 850 is implemented within RAM 224 and holographic checkpoint functionality 810 may optimize checkpoint state information 846, for example by excluding unnecessary information, to reduce the size of checkpoint state information 846.

Checkpoint state information 846 may include one or more of system files, registry keys, other installed programs and drivers, data and data sets, etc. Specifically, checkpoint state information 846 defines a condition of node 100 that allows for restarting processing of parallel application 104 and parallel data 105 from the state at the time checkpoint state information 846 is recorded. Where checkpoint state information 846 is too large to fit within RAM 224, for example when the number of nodes is large, checkpoint store 850 is implemented within SSD 226. Within each node 100, checkpoint state information 846 may be used to restart operation of the node from a previously stored checkpoint after one or more other nodes fail. Holographic checkpoint functionality 810 periodically and systematically exchanges checkpoint state information 846 of parallel application 104 and parallel data 105 between nodes 100 of parallel environment 101.

Holographic checkpoint functionality 810 may cooperate with cluster configuration software such that environment 101 reconfigures after failure of one or more nodes 100 where replacement (spare) nodes are not available. See U.S. patent application Ser. No. 11/849,050, titled "System and Method for Accessing and Using a Supercomputer," filed Aug. 31, 2007, incorporated herein by reference.

Within each node 100(1)-100(4), PPCA 128 periodically generates checkpoint state information 846 that defines a restart point for that node. In one example of operation, parallel application 104 periodically generates a checkpoint request that instructs PPCA 128 to record the current state of node 100 as checkpoint state 846 within checkpoint store 850. Since holographic checkpoint functionality 810 operates on PPCA 128, holographic checkpoint functionality 810 causes a minimal performance impact upon processing of parallel application 104 within node 100.

In one example of operation, PPCA 128 receives a checkpoint command from node 100 that includes associated checkpoint state information 846 of node 100. Holographic checkpoint functionality 810 stores checkpoint state information 846 within checkpoint store 850, and then performs an all-to-all exchange of checkpoint state information 846 with other nodes of environment 101, including nodes that are processing parallel application 104 and parallel data 105. Not all nodes 100 of environment 101 may be active processing parallel application 104; spare nodes (i.e., non-active nodes) may not be involved in the all-to-all data exchange. The all-to-all exchange is shown in FIGS. 9A-C and described below. If an active node fails, a spare node is activated to replace the failed node, and checkpoint state information 846 of the failed node is transferred to the activated node from one or more of the other active nodes. See FIG. 10.

In an embodiment, all active nodes perform the all-to-all exchange of checkpoint state information 846 and spares nodes receive checkpoint state information 846 such that each spare node may be activated to replace a failed active node without further data exchange, since checkpoint information is already stored on each spare node. In an alternate embodiment, and where no spare nodes are available within environment 101, environment 101 may be reconfigured to resume processing of parallel application 104 and parallel data 105, as described in the above reference application U.S. patent application Ser. No. 11/849,050.

Holographic checkpoint functionality 810 operates without a master checkpoint server and permits resumption of processing of parallel application 104 after node failure providing parallel application 104 and parallel data 105 are operable with the number of remaining nodes.

In a master-less system, the number of nodes required to perform a task is reduced relative to a master-slave system. The reduced number of nodes in turn reduces the time required to perform an all-to-all exchange of checkpoint state information 846. Equations (1) and (2) below determine the time required to perform one complete backup of checkpoint state information. For a prior art cluster having a master-slave checkpoint operation, checkpoint state information transfer time is defined as:

$$T_{M-S} = \frac{DN}{vb}, \quad (1)$$

where T=time required to complete a transfer of data,
D=dataset size,
N=# of slave nodes
υ=# of communication channels, and
b=bandwidth of the channel.

For a master-less holographic checkpoint operation, as provided by holographic checkpoint functionality 810, checkpoint state information 846 transfer time is defined as:

$$T_{M-less} = \frac{D(N-1)}{2vb} \quad (2)$$

In regards to the time equations, the master-less system's checkpoint operation has two advantages over the master-slave system's checkpoint operation. First is a performance doubling that can be seen in the denominator of equation (2). This performance doubling is obtained by the compression afforded by PPCA 128, as described below with reference to FIG. 11. Second is a reduced node count, (N−1), in the numerator of equation (2), since in the master-less system, there is no master node.

As the number of nodes in a computer cluster increases, the mean time to failure decreases, and thus it becomes more important to store checkpoint status to allow recovery from failure. The efficiency and reliability facilitated by holographic checkpoint functionality 810 reduces the down time between failures for environment 101, thereby maintaining the overall efficiency of operation.

FIGS. 9A-C show three exemplary full duplex all-to-all exchange moves for transferring checkpoint state information 846 between four nodes 100 of environment 101. The all-to-all exchange utilizes the bidirectional channels of each communication channel between PPCA 128 and switch 116 independently. In a first move, shown in FIG. 9A, four simultaneous transfers occur. In the first transfer, PPCA 128(A) of node 100(1) transmits its checkpoint state information 846 to PPCA 128(B) of node 100(2).

In the second transfer, PPCA 128(B) transmits its checkpoint state information 846 to PPCA 128(A). In the third transfer, PPCA 128(C) of node 100(3) transmits its checkpoint state information 846 to PPCA 128(D) of node 100(4). In the final transfer, PPCA 128(D) transmits its checkpoint state information 846 to PPCA 128(C). In a second move, shown in FIG. 9B, four simultaneous transfers occur. In the first transfer, PPCA 128(A) of node 100(1) transmits its checkpoint state information 846 to PPCA 128(C) of node 100(3). In the second transfer, PPCA 128(C) transmits its checkpoint state information 846 to PPCA 128(A). In the third transfer, PPCA 128(B) of node 100(2) transmits its checkpoint state information 846 to PPCA 128(D) of node 100(4). In the final transfer, PPCA 128(D) transmits its checkpoint state information 846 to PPCA 128(B).

In a third move, shown in FIG. 9C, four simultaneous transfers occur. In the first transfer, PPCA 128(A) of node 100(1) transmits its checkpoint state information 846 to PPCA 128(D) of node 100(4). In the second transfer, PPCA 128(D) transmits its checkpoint state information 846 to PPCA 128(A). In the third transfer, PPCA 128(B) of node 100(2) transmits its checkpoint state information 846 to PPCA 128(C) of node 100(3). In the final transfer, PPCA 128(C) transmits its checkpoint state information 846 to PPCA 128(B). After the third move, each PPCA 128 stores checkpoint state information 846 for all four nodes 100.

In another alternative embodiment, spare nodes (not shown) receive checkpoint state information 846 data. In this embodiment, after performing the three moves described in FIGS. 9A-C, one of the active nodes, for example, node 100(1), performs a one-to-many exchange of checkpoint state information 846 to all the spare nodes of parallel environment 101. In this way, any one of the spare nodes may become an active, replacement, node without further data transfer.

By periodically storing checkpoint state information 846 for active nodes of environment 101, recovery from failure of any one or more active nodes 100 can occur from the time of the most recently stored checkpoint state information 846 information. FIG. 10 shows exemplary recovery of environment 101 upon failure of node 100(3) of an active three node (nodes 100(1), 100(2) and 100(3)) cluster. Failed node 100(3) is replaced by a spare node 100(4), and active processing is restarted from the most recently stored checkpoint state information 846 from failed node 100(3).

In one example, failure of node 100(3) is determined by node 100(2) when communication 1010 between nodes 100(2) and 100(3) is not acknowledged. Node 100(2) then selects 1020 spare node 100(4) and sends its most recently stored checkpoint state information 846 (at least checkpoint state information associated with failed node 100(3)) to spare node 100(4). Where spare node 100(4) already has checkpoint state information 846 of failed node 100(3), state information need not be transferred. Node 100(4) then sends a restart command 1030(1) to node 100(2), which is propagated as restart command 1030(2) to node 100(1). Each node then restarts active processing from its most recently stored checkpoint state information 846, and node 100(4) replaces node 100(3), restarting from the most recent checkpoint state information 846 associated with node 100(3).

Where environment 101 is a Howard Cascade (see for example U.S. Pat. No. 6,857,004, incorporated herein by reference), node 100(2) may be logically adjacent to (i.e., nearest within the Howard cascade) node 100(3) and thus most likely to detect a failure of node 100(3). Optionally, the restart command may include a restart time that identifies a particular set of stored checkpoint state information 846, thereby allowing restart from earlier stored checkpoint state information 846. In an alternative embodiment, node 100(4) simultaneous broadcasts restart command 1030 to nodes 100(1) and 100(2) to ensure a simultaneous restart from the checkpoint state information 846.

Compression/Decompression

FIG. 11 shows PPCA 128 with exemplary compression and decompression (C/D) functionality 1110 for automatically compressing and decompressing data communications to and from node 100. C/D functionality 1110 includes one or more compressor 1116, decompressor 1117 and comparator 1104 modules that cooperate to minimize the size of data transferred between nodes 100 of environment 101 to increase performance thereof. Compressor 1116 and decompressor 1117 may be realized by one or more lossless "codecs" or other such software modules loaded into PPCA 128. Compressor 1116, decompressor 1117 and comparator 1104 modules may represent instructions stored within NVM 224 and loaded into RAM 224 for execution by CPU 222. C/D functionality 1110 utilizes a C/D store 1124 for temporarily storing data for compression and decompression. C/D store 1124 may be implemented in one or both of RAM 224 and SSD 226 of PPCA 128, for example, based upon size of data 1120 and availability of one or both of RAM 224 and SSD 226.

In an embodiment, compressor 1116 and decompressor 1117 utilize the Lempel-Ziv-Welch (LZW) lossless data compression algorithm. In other embodiments, alternative lossless compression algorithms are used.

Compression saves transmission time only when the number of transmission frames required to transmit compressed data 1122 is less than the number of frames required to transmit uncompressed data 1120 over Ethernet channel 221. The size of the transmission frame is, for example, dependent upon the protocol selected for use over Ethernet channel 221. Prior to compressing data 1120, comparator 1104 may compare the size of data 1120 to the size of a single transmission frame to determine if compression of data 1120 may save transmission time. Where the size of data 1120 is smaller or equal to the size of a single transmission frame, compression cannot reduce the transmission time since only complete frames are transmitted, and therefore data 1120 is not compressed.

Where the size of data 1120 is greater than the size of the transmission frame, compressor 1116 compresses data 1120 to form compressed data 1122. Comparator 1104 then determines a first number of frames required to transmit compressed data 1122 and a second number of frames required to transmit data 1120. If the first number of frames is less than the second number of frames, compressed data 1122 is transmitted over Ethernet channel 221, otherwise data 1120 is transmitted over Ethernet channel 221 and compressed data 1122 is discarded.

Upon receiving data over Ethernet channel 221, if the data is not compressed, as indicated by flag 1131 associated with the received data (e.g., as defined within the protocol or within the received data itself) the received data is stored within C/D store 1124 as uncompressed data 1121. If the data is compressed, the received data is stored within C/D store 1124 as received data 1126 and decompressor 1117 decompresses received data 1126 to form uncompressed data 1121. Uncompressed data 1121 may be further processed by PPCA 128 and/or transferred to node 100.

Optionally, C/D functionality 1110 determines an estimated data size 1123 of compressed data 1120 without compressing data 1120. Comparator 1104 compares estimated data size 1123 with the size of data 1120. If it is determined that the estimated date size 1123 may reduce the transmission time of data 1120, then compressor 1116 compresses data 1120, stores it as compressed data 1122 in C/D store, optionally including flag 1130 and transmits data 1122. Otherwise, data 1120 is transmitted uncompressed.

In one example of operation, PPCA 128 receives data 1120 from node 100 for output to one or more other nodes 100 of environment 101 and stores data 1120 within a C/D store 1124. Compressor 1116 compresses data 1120 to form compressed data 1122 and includes flag 1130 to indicate that it is compressed. Comparator 1104 then determines the number of transmission frames required to transmit compressed data 1122, based upon the size of compressed data 1122 and the amount of data that is included within each transmission frame. Comparator 1104 then determines the number of transmission frames required to transmit data 1120 without compression. If the number of frames required to transmit the compressed data 1122 is less than the number of frames required to transmit data 1120 uncompressed, PPCA 128 transmits compressed data 1122; otherwise PPCA 128 transmits data 1120 uncompressed.

C/D functionality 1110 may operate transparently within other functionality of PPCA 128 as described herein. For example, holographic checkpoint functionality 810 of FIG. 8 benefits from compression, as noted for Equation (2).

Automatic Protocol Selection

FIG. 12A shows PPCA 128 of FIG. 1 with exemplary Automatic Protocol Selection (APS) functionality 1210 for selecting a communication protocol for use between nodes 100 of environment 101. APS functionality 1210 selects a lowest latency communication protocol and route supported by the communicating nodes, and may override the global LLP selected by LLP select function 400, FIG. 4. Specifically, APS 1210 selects the lowest latency protocol supported by two communicating nodes, and may select a lower latency protocol that is faster than the global LLP selected by LLP select function 400.

APS functionality 1210 may represent instructions stored within NVM 222 that are loaded into RAM 224 and executed by MPU 212, FIG. 2. APS functionality 1210 utilizes an APS store 1224 within PPCA 128 for storing topology data 1223 that lists at least configuration and protocol information supported by each node 100 of environment 101. APS store 1224 may be implemented within one or more of SSD 226, RAM 224 and NVM 222 of PPCA 128. Topology data 1223 is, for example, loaded into APS store 1224 during configuration of environment 101. APS functionality 1210 selects the fastest protocol based upon certain parameters, including, but not limited to, data 1222 properties (e.g., data size), protocols shared by both transmitting and receiving nodes and topology data 1223.

In one example of operation, data 1222 is transmitted from node 100(1) (the source node) to node 100(6) (the destination node) via nodes 100(4) and 100(5). Data 1222 may represent at least part of parallel data 105 of node 100(1), as shown in FIG. 1. Prior to transmitting data 1222 from transmitting node 100(1) to receiving node 100(4) APS functionality 1210 selects a fastest communication protocol for use between nodes 100(1) and node 100(4).

APS functionality 1210 may compare a transmit time (based upon size) of data 1222 against a time for data 1222 to traverse an associated protocol stack. Where the transmission time is greater than the time to traverse the associated protocol stack, APS functionality 1210 selects a robust transmission protocol (e.g., TCP/IP), otherwise APS functionality 1210 selects a lower latency protocol that is common to the transmitting node and the receiving nodes. APS functionality 1210 may determine whether data 1222 will traverse more than one network (e.g., via the Internet) to reach the destination node. Where data 1222 is required to traverse more than one network, APS functionality 1210 selects a more complete protocol, such as TCP/IP, regardless of the size of data 1222. Where node 100(1) and node 100(6) are in the same network, as shown in FIG. 12A, APS functionality 1210 within each node along the transmission path between node 100(1) and node 100(6) determine a lowest latency protocol shared by each transmit/receive node pair.

Based upon size of data 1222, APS functionality 1210 may select a faster, lower latency protocol in place of a slower global protocol, for example, selected by LLP process 450, such that data transfer speeds within the transmission path (e.g., nodes 100(1), 100(4), 100(5) and 100(6)) are improved. In one example, where protocols supported by each node 100(1), 100(4), 100(5), and 100(6) varies, APS functionality 1210 within each PPCA 128(A), 128(D), and 128(E) selects an appropriate protocol 1202, 1204, and 1206, respectively, for transmission of data 1222 to the receiving node. Examples of protocols 1202, 1204, and 1206 are, but not limited to, CLIC, GAMMA, Active Ports and Active Messages.

FIG. 12B shows one exemplary process 1250 for selecting a lowest latency communication protocol shared by a transmit node and a receive node in each step of a transmission path. Process 1250 is implemented by APS functionality 1210, FIG. 12A. FIGS. 12A and 12B are best viewed together with the following description. APS functionality 1210 may be invoked by MPI devolver 314, FIG. 3, prior to transfer of at least part of parallel data 105 to another node of environment 101 as initiated when parallel application 104 invokes MPI 106.

Step 1256 is a decision. If, in step 1256, process 1250 determines that the transmission crosses multiple networks, process 1250 continues with step 1268; otherwise, process 1250 continues with step 1260. In one example of step 1256, APS functionality 1210 evaluates topology data 1223 to determine that the source node, node 100(1), and the destination node, node 100(6), are located in the same network.

Step 1260 is a decision. If, in step 1260, process 1250 determines that the data to be transmitted requires a robust protocol, process 1250 continues with step 1268; otherwise, process 1250 continues with step 1266. In one example of step 1260, APS functionality 1210 evaluates the size of data 1222 and if the size is greater that a predefined threshold, APS functionality 1210 continues to step 1268 of process 1250. The predefined threshold may be preset within PPCA 128, or may be determined during configuration of environment 101 by an operator or by APS functionality 1210. An example of threshold determination is a data size which requires substantially longer to transmit, via supported protocol and communication medium (e.g., wireless 802.11g, cat 5 cable, etc.), than to traverse the protocol stack.

In step 1268, process 1250 selects a robust protocol and process 1250 terminates. In one example of step 1268, APS functionality 1210 selects the TCP/IP protocol for transmission of data 1222 and return control to MPI devolver 314.

In step 1266, process 1250 selects the lowest latency protocol supported for transmission to the next node. In one example of step 1266, APS functionality 1210 utilizes topology data 1223 to determine the lowest latency protocol supported by a transmitting node and a receiving node in the transmission path. APS functionality 1210 then selects the determined lowest latency protocol for transmission of data 1222. Process 1250 then terminates. MPI devolver 314 then utilizes the selected protocol to transmit data 1222 to the next node in the transmission path.

Optionally, in step 1266, if APS functionality 1210 within PPCA 128(A) determines that each node 100 in the transmission path supports the same lowest latency protocol, APS functionality 1210 selects that protocol for the entire transmission path such that APS functionality 1210 within PPCA 128(D) and (E) within nodes 100(4) and 100(5) are bypassed.

The ordering of steps 1256, 1260, 1266 and 1268 may change without departing from the scope hereof.

Software Defined Radio Card

PPCA 128 may include software-defined radio (SDR) technology to provide inter-node communication within environment 101 as an alternative to other more cumbersome technologies, for example, blade technology. SDR technology utilizes software controlled radio hardware and software implemented radio functionality that reduces the size and cost of the radio hardware and, through software control, increases the flexibility of the provided communication capability. Reconfiguration of SDR is by software and does not require hardware changes. SDR technology provides wireless communication wherein multiple aspects of a radio signal (e.g., frequency, amplitude, etc.) are manipulated to increase the number of communication channels available at a particular frequency. By combining SDR technology within PPCA 128, inter-node communication within parallel environment 101 may be implemented without requiring the significant amount of wiring between nodes 100 and switch 116. SDR technology may provide hundreds to thousands of communication channels that allow nodes 100 to communicate with one another without the need for physical connections (wires) or the use of network switching technology.

FIG. 13A shows one exemplary PPCA 1328 that includes SDR components 1320. PPCA 1328 is similar to PPCA 128 of FIG. 2; except that Ethernet connect 220 and Ethernet channel 221 are replaced by SDR components 1320 and SDR antenna 1338 that cooperate to provide SDR functionality, under control of SDR software 1332 within PPCA 1328. CPU 1312, a N/S bridge 1318, NVM 1322, RAM 1324, bus 1340 and optional SSD 1326 have similar functionality to MPU 212, N/S bridge 218, NVM 222, RAM 224, bus 140 and optional SSD 226, respectively, of PPCA 128. Optionally, PPCA 1328 may include both Ethernet connect 220 and SDR components 1320 to provide greater flexibility in connectivity.

SDR components 1320 include an SDR controller 1334 and SDR hardware 1336. SDR controller 1334 may represent a digital signal processor, or the like, and include memory and firmware (not shown) for controlling SDR hardware 1336 to transmit and receive radio signals. As known in the art, SDR components 1320 may replicate functionality of analog radio hardware, such as filtering and amplifying signals received from and transmitted to SDR antenna 1338. SDR components 1320 provide a communication bandwidth that ranges from tens to thousands of megabits per second and may be used with high performance computers.

SDR hardware 1336 may also include a digital to analog converter (DAC) (not shown) and an analog to digital converter (ADC) (not shown) for converting digital signals to and from analog radio signals. SDR controller 1334 may be configured to provide digital up/down wave conversion, signal modulation, signal demodulation, security (e.g., frequency hopping), signal processing (e.g., digital filtering, channelization, error correction, etc.), transmit power optimization, and protocol conversion (e.g., converting protocols selected by LLP selection process 450, FIG. 4B and/or APD functionality 1210, FIG. 12A, into radio waves.)

SDR software 1332 is stored within NVM 1322 and loaded (as shown in dashed outline), at least in part, into RAM 1324 for execution by CPU 1312. SDR software 1332 interacts within CDR controller 1334 to control CDR hardware 1336 to provide radio communication. SDR software 1332 may utilize an SDR table 1330 that defines one or more radio channels that are assigned to each node for purposes of communication. For example, SDR table 1330 is shown with an R-channel 1342 assigned to a node ID 1344.

FIG. 13B shows one a parallel processing environment 1350 with five nodes 1360(1)-1360(5), where each node communicates using PPCA 1328(A)-1328(E), respectively. Nodes 1360 are the similar to nodes 100 of FIG. 1, but each includes one PPCA 1328 in place of PPCA 128. PPCAs 1328(B)-(E) are similar to PPCA 1328(A), but are shown in less detail for clarity of illustration. Nodes 1360(1)-(5) are assigned r-channels 1371-1375, respectively. SDR table 1330, within PPCA 1328(A), is shown associating the assigned r-channels 1371-1375 with nodes 1360(1)-(5). Alternatively, r-channels 1371-1375 may be assigned to PPCA 1328(A)-(E), respectively, and stored within SDR table 1330, without departing from the scope hereof.

SDR functionality 1352 represents functionality provided by SDR software 1332 when controlling SDR components 1320, SDR controller 1334, and SDR hardware 1336. SDR functionality 1352 is shown with radio frequency (RF) processing functionality, r-channel look-up functionality (i.e. functionality for looking up r-channel assignments to each node 1360), DAC functionality, ADC functionality, DSP functionality, and error correction functionality. SDR functionality 1352 may additionally include, but is not limited to, digital down conversion functionality, digital up converter functionality, digital to analog protocol conversion functionality, security protocols functionality, channelization functionality, and filtering functionality.

Furthermore, SDR functionality 1352 may include an adaptive intelligence software radio functionality and anti-aliasing filter functionality, as known in the art. SDR functionality 1352 may include additional functionality without departing from the scope hereof.

In one example of operation, node 1360(1) sends data to node 1360(3). The data is transferred from memory (e.g., main memory and auxiliary memory) of node 1360(1) to PPCA 1328(A) using MPI 106 and MPI devolver 314, whereupon SDR functionality 1352 utilizes r-channel lookup functionality to retrieve r-channel 1373 based upon its association with node 1360(3) within SDR table 1330. SDR functionality 1352 then selects r-channel 1373 through control of SDR components 1320 and transmits, using an appropriate protocol, the data to PPCA 1328(C) of node 1360(3). Within PPCA 1328(C), SDR functionality 1352 receives and decodes the data received on r-channel 1373, and transfers the data to memory of node 1360(3).

In an alternate embodiment, SDR table 1330 is included within PPCA 1328(A) only, and PPCA 1328(B)-(E) include r-channel 1371 of node 1360(1). FIGS. 14-16(B) exemplify communication based upon a fixed r-channel assignment for each node 1360. With fixed r-channel assignment, each PPCA 1328 utilizes SDR table 1330 to lookup the r-channel assigned to the node 1360 with which communication is desired. Assignment of r-channels 1371-1374 to nodes 1360(1)-(4), respectively, occurs at startup of computer clusters 1400, 1500, and 1600; further assignment of r-channels is not required.

In the example of FIG. 14, four nodes 1410(1)-(4) of a parallel processing environment 1350 each include one PPCA 1328(A)-(D), and is assigned a fixed r-channel 1371-1374, respectively. PPCA 1328(A) includes SDR table 1330 that defines r-channel assignments for each node 1360(1)-(4). PPCA 1328(B)-(D) each include a definition of r-channel 1371 that is assigned to node 1360(1). Each PPCA 1328(B)-(D) may thereby communicate with PPCA 1328(A) of node 1360(1) to access information of SDR table 1330 within PPCA 1328(A).

In one example of operation, node 1360(2) communicates data 1480 to node 1360(3). Node 1360(2) initiates the communication, for example through use of MPI 106 and MPI devolver 314, and transfers data 1480 to PPCA 1328(B). PPCA 1328(B) transmits a request 1402, using r-channel 1371 assigned to node 1360(1). Request 1402 includes the identity of node 1360(3) and requests the r-channel assigned to node 100(3) be returned via r-channel 1372. In an embodiment, node 1360(3) is identified by its position within a Howard Cascade. In the following examples, the reference labels of nodes 1360(2)-(5) are used to represent the assigned node ID for clarity of illustration. PPCA 1328(A) receives request 1402, retrieves r-channel 1373 from SDR table 1330 and transmits response 1404 containing r-channel 1373, using r-channel 1372. PPCA 1328(B) receives response 1404 then transmits a message 1406, containing data 1480, using r-channel 1473 to PPCA 1328(C) of node 1360(3). Since SDR table 1330 is included only within PPCA 1328(1), update of SDR table 1330, for example when new nodes are added to an environment 1350, does not require changes within other nodes of environment 1350.

In another embodiment, each of PPCA 1328(B)-(E) includes a copy of SDR table 1330 and r-channel assignment to nodes 1360(2)-(5) is determined at startup of environment 1350. FIGS. 15A and 15B show exemplary startup interaction between PPCA 1328(A)-(E) to generate and distribute SDR table 1330 utilizing a gather and scatter process. In the example of FIGS. 15A and 15B, node 1360(1) is elected as the gathering node, is pre-assigned r-channel 1371, and PPCA 1328(A) is thereby elected to build SDR table 1330. SDR table 1330 may be pre-initializes with the ID of node 1360(1) and its pre-assigned r-channel 1371. An available r-channel table 1530 is pre-loaded with available r-channels that may be used by SDRs of PPCA 1328 within environment 1350. Each other PPCA 1328(B)-(E) installed within other nodes 1360 of environment 1350 is pre-initialized with r-channel 1371 of gathering node 1360(1). PPCA 1328(A)-1328(E) may have the ID of node 1360(1) and its pre-assigned r-channel 1371 stored within NVM 222 of each PPCA 1328. Upon startup of environment 1350, each PPCA 1328 that does not have a pre-assigned r-channel (i.e., that is not designated as the gathering node) transmits a request 1510 for r-channel assignment to the designated gathering node using the pre-assigned r-channel (e.g., r-channel 1371). Each request 1510 contains the ID of the sending node 1360, which is used, at least in part, for assigning r-channels. Request for r-channel assignment 1510 may utilize handshaking and other protocols to avoid transmission collision, as known in the art of SDR.

Upon receiving each request 1510 for r-channel assignment, PPCA 1328(A) selects and removes one available r-channel 1372 from available r-channel table 1530, and stores the selected r-channel in association with the received node ID in SDR table 1330. For example, upon receiving request 1510 for r-channel assignment from node 1360(2), PPCA 1328(A) selects and removes r-channel 1372 from available r-channel table 1530, and stores r-channel 1372 in association with the ID of node 1360(2) within SDR table 1330.

Once all requests 1510 for r-channel assignment are processed, SDR table 1330 is distributed from PPCA 1328(A) to each other PPCA 1328 as shown in FIG. 15B. For example, PPCA 1328(A) broadcasts SDR table 1330 to PPCA 1328 (B)-(E) on a broadcast r-channel, to which PPCA 1328(B)-(E) are tuned after transmitting request 1510.

Once SDR table 1330 is received, each PPCA 1328 may lookup the selected r-channel for communication with any other node of environment 1350. Thus, the need to first contact a central PPCA to obtain r-channel information prior to each data transmission is avoided.

FIG. 16 shows exemplary use of an all-to-all exchange for assigning one or more r-channels to each of four nodes 1360 of environment 1350 to form a distributed SDR table 1626. SDR table 1626 is similar to SDR table 1330 of FIG. 14 and FIG. 15, although SDR table 1626 contains r-channel assignment data for four nodes, nodes 1360(2)-1360(5).

Each node 1360 is assigned a node ID, for example the node's position within a Howard cascade. In this example, the reference labels of nodes 1360(2)-(5) are used to represent the assigned node ID for clarity of illustration. Within each node, PPCA 1328 contains an r-channel base table 1620 that defines, for each node in environment 1350, a receiving r-channel. Each PPCA 1328 also contains an r-channel assignment algorithm 1622 that assigns one or more r-channels (e.g., r-channels 1371-1375 of FIG. 13B) to each node based upon the assigned node ID of the node.

In one example of operation, an all-to-all exchange is performed using the defined r-channels within base table 1620. Each node 1360 sends a notification message containing its assigned ID to each other node of environment 1350. For example, in a first step of the all-to-all exchange, nodes 1360 (2) and 1360(3) send a notification message to each other and nodes 1360(4) and 1360(5) send a notification message to each other, simultaneously. In a second step of the all-to-all exchange, nodes 1360(2) and 1360(6) send a notification message to each other and nodes 1360(3) and 1360(4) send a notification message to each other, simultaneously. In a third step of the all-to-all exchange, nodes 1360(2) and 1360(4) send a notification message to each other and nodes 1360(3) and 1360(5) send a notification message to each other, simultaneously.

Upon receiving a notification message from another node, r-channel assignment algorithm 1622 assigns one or more r-channels to the node identified within the notification, and stores those r-channel assignments, together with the ID of the notifying node, in its copy of SDR table 1626. Since r-channel assignment algorithm 1622 assigns r-channels to each node based upon the node's ID, after the all-to-all exchange, each SDR table 1626 contains r-channel assignment information that allows nodes 1360 to communicate with any other node in environment 1350. Once generated, SDR table 1626 is used in a similar manner to SDR table 1330, FIG. 15B.

For bi-directional communication between two nodes 1360, at least two r-channels are used, one in each communication direction. For example, SDR table 1626 may define one receive r-channel for each node, such that the receive r-channels assigned to each of the two communicating nodes form a bi-directional communication link. In an alternate embodiment, SDR table 1626 defines multiple r-channels for one or more nodes 1360 to facilitate additional communication capabilities.

In another embodiment, each node within a Howard Cascade receives (for example on an r-channel assigned for receiving broadcast messages) a message defining the topology, containing Howard Cascade based node IDs, of the Howard cascade. Within each node 1360, r-channel assignment algorithm 1622 generates SDR table 1626 by automatically assigning r-channels to each possible node ID of the Howard Cascade.

In another embodiment, SDR tables 1330 and 1626 may be updated dynamically, wherein fixed channel node assignments are replaced or augmented with dynamic channel node assignments. A dynamic channel node assignment is utilized when a PPCA 1328 receives a new r-channel assignment, for example an r-channel assignment for a previously unassigned node. The receiving PPCA 1328 stores the new r-channel assignment within SDR table 1626 and broadcasts at least the new assignment to all other nodes of environment 1350, thereby dynamically updating all SDR tables 1626 within environment 1350 with the dynamic r-channel assignment.

Further details can be found in the current standard for SDR, entitled "Software Communications Architecture Specification version 2.2.2" (SCA 2.2.2), incorporated herein by reference.

Single Time-Step Checkpoint/Restart

In the standard master-slave checkpoint/restart model the time it takes to perform the checkpoint operation grows with the number of slave nodes, as discussed in FIG. 8. The current state of the art manage the amount of time require to perform a checkpoint operation by partitioning a computer cluster into multiple checkpoint areas. Each checkpoint area includes a master node a one or more slave nodes. The failure of a master node in any of the partitions causes the checkpoint/restart to fail. As described above, the checkpoint time for a master-slave system is $t=DN/nb$, where D=the dataset size to be transferred, N=the number of nodes, n=the number of communication channels per node, and b=the bandwidth per communication channel The holographic checkpoint/restart functionality, described in FIGS. 8-10, directly addresses the single point of node failure by having each node involved, that is, each node saves checkpoint data from every other node involved in the checkpoint operation. Additionally, as described in FIG. 8, the time required to perform a holographic checkpoint/restart process ($t=D(N-1)/nb$), is slightly reduced compared to the master-slave system. A second solution, single time-step checkpoint/restart, is introduced here which further reduce the time required to perform a checkpoint operation while utilizing a more robust checkpoint data storage device, a switch.

FIG. 17 shows a single time-step checkpoint/restart enabled system 1701, for simultaneously (in a single time step) writing and reading checkpoint data to and from a switch supported checkpoint storage device. System 1701 includes a checkpoint/restart enabled switch 1716 and four nodes 100. Switch 1716 has a wire speed data storage device, checkpoint RAM 1718, for storing a checkpoint data 1720 for system 1701. Due to the robust construction of switches, as compared to nodes and servers, system 1701 is a robust checkpoint/restart system.

To facilitate simultaneous read/write functionality, switch 1716 supports bandwidth to maintain parallel wire speeds for all nodes 100. All nodes 100 simultaneously transmitting checkpoint data to switch 1716, stored as checkpoint data 1720, eliminates the dependency on the number of nodes N from the single time-step checkpoint time equation, $t=D/nb$. This means that a cluster using the single time-step checkpoint/restart model is (N−1) times faster than the standard master/slave model and (N−2) times faster than the holographic checkpoint model. In addition, the checkpoint operation time does not increase with an increase in the number of nodes in a single time-step checkpoint system. That is, the time required to perform a single time-step checkpoint operation is always the same no matter how many nodes exist within the computer cluster.

Like the holographic checkpoint model, the single time-step checkpoint/restart model also eliminates the single point of node failure found in the master/slave model.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A Parallel Processing Communication Accelerator (PPCA) for enhancing performance of a Parallel Processing Environment (PPE) formed of a plurality of computing nodes, the PPCA comprising:
   a microprocessing unit (MPU);
   a memory comprising RAM and coupled to the MPU;
   a PPE connection for communicating data with other nodes within the parallel processing environment;
   a host node connection for communicating with a host node;
   a Message Passing Interface (MPI) devolver for (1) communicating with an MPI implemented on the host node to provide optimized communication between a parallel application of the host node and the parallel processing environment, and for (2) processing at least a portion of the MPI including one or more of MPI collective-commands, MPI blocking commands, MPI group commands, and MPI topology; and
   firmware for holographic checkpoint functionality including instructions for saving an operational state of the host node within the memory and for exchanging the operational state with other PPCAs such that at least one node within the parallel processing environment may resume execution of a portion of the parallel application from the saved operational state.

2. The PPCA of claim 1, the memory further comprising a non-volatile memory.

3. The PPCA of claim 1, the MPI devolver performing low-level communication handshaking with other nodes without interrupting the host node.

4. The PPCA of claim 1, the PPCA configured as an interface card for plugging into an interface card slot of the host node.

5. The PPCA of claim 4, the interface card configured as a PCIe interface card and the interface card slot comprising a PCIe card slot.

6. The PPCA of claim 1, further comprising a lowest latency protocol (LLP) select function to select a lowest latency communication protocol supported by all nodes of the parallel processing environment from a plurality of protocols supported by the PPCA.

7. The PPCA of claim 1, further comprising a paging function for interfacing with an operating system of the host node to store a paging file in the memory of the PPCA.

8. The PPCA of claim 7, the memory further comprising nonvolatile memory further comprising a solid state drive (SSD).

9. The PPCA of claim 1, further comprising virtual disk array (VDA) functionality for implementing distributed data storage in two or more PPCAs of the PPE.

10. The PPCA of claim 9, the memory further comprising one or more of nonvolatile memory (NVM) and a solid state drive (SSD).

11. The PPCA of claim 9, wherein the VDA functionality within each of the node supported PPCAs cooperate to store data redundantly within the parallel processing environment.

12. The PPCA of claim 9, wherein the VDA functionality within each of the two or more PPCAs cooperates to function as a single storage system.

13. The PPCA of claim 12, wherein the VDA functionality maintains metadata that includes location information for data stored within the VDA, the location information comprising an identification of a PPCA where the data is stored.

14. The PPCA of claim 13, wherein the metadata is distributed to the two or more PPCAs, each PPCA being configured to retrieve the metadata.

15. The PPCA of claim 1, further comprising network attached device (NAD). caching functionality for caching data of the NAD within the memory of the PPCA.

16. The PPCA of claim 15, the NAD caching functionality caching data to be written to the NAD.

17. The PPCA of claim 1, wherein the firmware for holographic checkpoint functionality comprises instructions for exchanging the saved operational state with all other nodes of the parallel processing environment such that an operational state of each node of the parallel processing environment is stored within the memory.

18. The PPCA of claim 17, wherein the firmware for holographic checkpoint functionality comprises instructions for transmitting the saved operational state to spare nodes of the parallel processing environment.

19. The PPCA of claim 1, the firmware for the holographic checkpoint function comprises instructions for restarting the host node by transferring the operational state to the host node after receipt of a restart command.

20. The PPCA of claim 1, the firmware for the holographic checkpoint function comprising instructions for initiating a reconfiguration of the topology of the parallel processing environment upon failure of a node.

21. The PPCA of claim 1, the holographic checkpoint function utilizing an all-to-all exchange to store the operational state of the parallel processing environment.

22. The PPCA of claim 1, further comprising:
    firmware for compressing the data to form compressed data;
    firmware for determining a first number of frames required to transmit the uncompressed data, determining a second number of frames required to transmit the compressed data, and selecting to transmit the uncompressed data if the first number is less or equal to the second number; otherwise selecting to transmit the compressed data; and firmware for decompressing compressed data received from another node;
    wherein the firmware for compressing, the firmware for determining and selection, and the firmware for decompressing cooperate to reduce the time to transmit the data from the host node to a receiving node.

23. The PPCA of claim 22, the firmware for compressing utilizing a Lempel-Ziv-Welch (LZW) lossless compression algorithm.

24. The PPCA of claim 22, the firmware for compressing performing compression of the data only if the size of the data is greater than one transmission frame.

25. The PPCA of claim 1, further comprising auto-protocol selection (APS) functionality for selecting a lowest latency protocol from a plurality of protocols supported by the PPCS for use to transmit data from a transmit host node to a receive node, the lowest latency protocol being supported by the transmit host node and the receive node.

26. The PPCA of claim 25, the APS functionality utilizing topology data that defines at least inter-node connectivity and protocols supported by the nodes for selecting the lowest latency protocol.

27. The PPCA of claim 1, the PPE connection comprising a software defined radio (SDR), the PPCA further comprising SDR software for selecting, based upon an SDR table, at least one SDR r-channel for communicating with at least one of the other nodes.

28. The PPCA of claim 27, the SDR comprising:
   an SDR hardware for sending and receiving radio signals; and
   an SDR controller for controlling the SDR hardware for sending and receiving data on the selected SDR r-channel.

29. The PPCA of claim 28, wherein the SDR table is pre-configured in the PPCA and r-channel assignment to the nodes is fixed.

30. The system of claim 28, wherein the SDR table is created dynamically based upon a gather-scatter methodology implemented by the SDR software.

31. The system of claim 28, wherein the SDR table is located on one PPCA of one pre-selected node within the parallel processing environment, each of the other PPCAs interrogating the one PPCA to retrieve r-channel information.

32. The PPCA of claim 28, wherein the SDR table is distributed to at least one PPCA on each of the nodes.

33. The PPCA of claim 1 further comprising at least one additional PPE connection for communicating data with other nodes within the parallel processing environment.

34. The PPCA of claim 33 wherein there are at least two additional PPE connections for communicating data with other nodes within the parallel processing environment, and wherein each PPE is Ethernet compatible.

35. The PPCA of claim 33 wherein the PPCA memory comprises machine readable instructions for performing a Lambda move.

* * * * *